United States Patent
Dent

(10) Patent No.: US 9,559,768 B2
(45) Date of Patent: Jan. 31, 2017

(54) SAME FREQUENCY SATELLITE TERRESTRIAL RADIO BROADCAST

(75) Inventor: Paul W. Dent, Pittsboro, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2569 days.

(21) Appl. No.: 12/034,283

(22) Filed: Feb. 20, 2008

(65) Prior Publication Data

US 2008/0291977 A1    Nov. 27, 2008

Related U.S. Application Data

(60) Provisional application No. 60/924,672, filed on May 25, 2007.

(51) Int. Cl.
*H04B 7/185*    (2006.01)

(52) U.S. Cl.
CPC ................... *H04B 7/18526* (2013.01)

(58) Field of Classification Search
CPC .................................. H04B 7/18526
USPC ........ 375/260, 267; 370/315, 321, 326, 347, 370/477; 455/440, 456.1, 456.2
See application file for complete search history.

(56) References Cited

U.S. PATENT DOCUMENTS

| | | | |
|---|---|---|---|
| 5,088,108 A | 2/1992 | Uddenfeldt et al. | |
| 5,761,605 A * | 6/1998 | Tawil et al. | H04B 7/18523 348/E7.093 |
| 6,636,744 B1 * | 10/2003 | Da | G01S 1/026 342/357.29 |

FOREIGN PATENT DOCUMENTS

| | | | | |
|---|---|---|---|---|
| AU | 767516 B2 | 3/2002 | | |
| AU | 767516 | * | 7/2002 | ............. H04B 7/185 |
| CN | 1306710 A | 1/2001 | | |
| WO | 01/65749 A1 | 9/2001 | | |
| WO | WO 01/65749 | * | 9/2001 | ............. H04J 11/00 |
| WO | WO0165749 | * | 9/2001 | ............. H04J 11/00 |

OTHER PUBLICATIONS

E. Lindskog et al., "A Transmit Diversity Scheme for Channels with intersymbol Interference", Stanford University—Department of Electrical Engineering, ISL, Stanford, CA, pp. 307-311.
Supplementary European Search Report dated Aug. 18, 2011 (6 pages).
Mexican Office Action w/ partial English translation dated Jun. 3, 2011 (6 pages).
Chinese Office Action dated Nov. 15, 2012 in Chinese Application No. 200880017429.4 (3 pages total).

* cited by examiner

*Primary Examiner* — Daniel Washburn
*Assistant Examiner* — Eboni Hughes

(57) ABSTRACT

A satellite broadcasts radio programs to mobile and fixed receivers at various locations. Ground stations supplement the satellite broadcasts in areas where the satellite signal may be shadowed. Likewise, the satellite signal supplements the terrestrial transmissions in areas with marginal terrestrial signal strength. Ground stations and a satellite transmit the same digital symbol stream over a same frequency spectrum. The symbol streams arrive in each service area of the ground stations with a relative delay that is within a window for which a receiver is adapted to decode efficiently. Spectral efficiency is achieved by allowing the ground stations to share the same frequencies as the satellites.

29 Claims, 19 Drawing Sheets

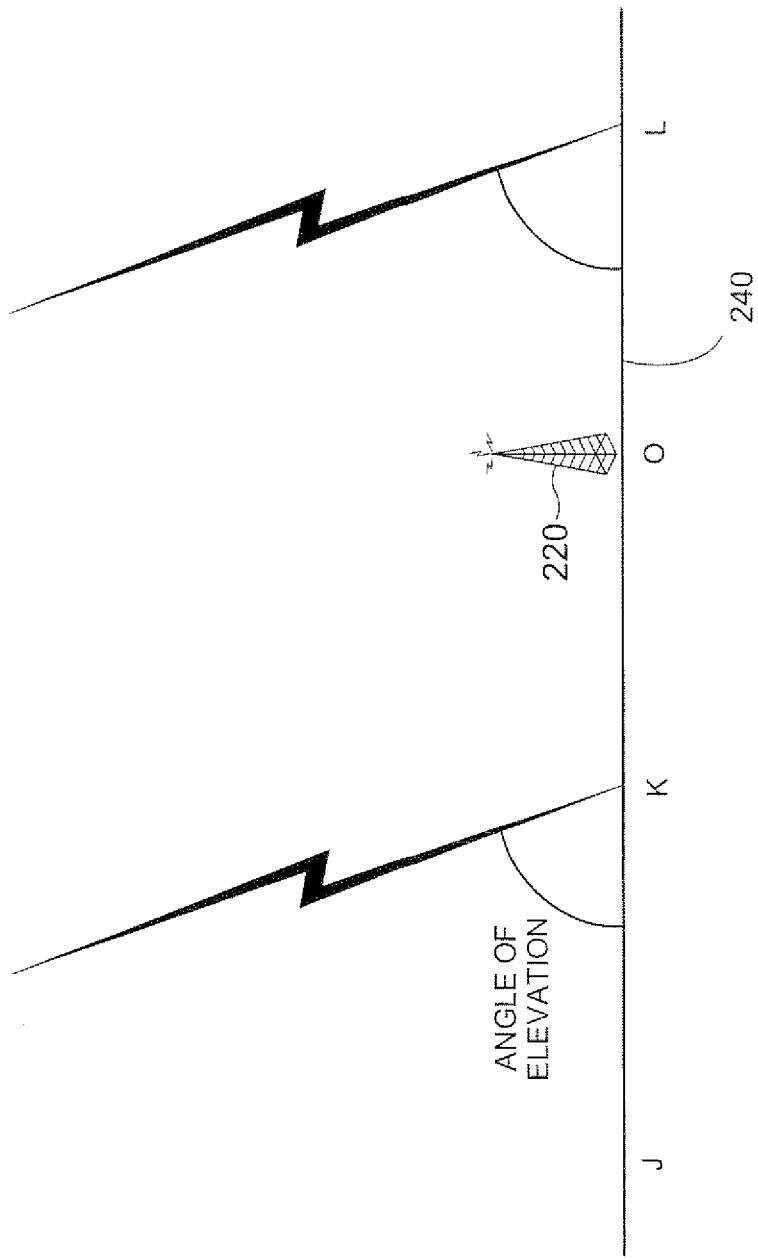

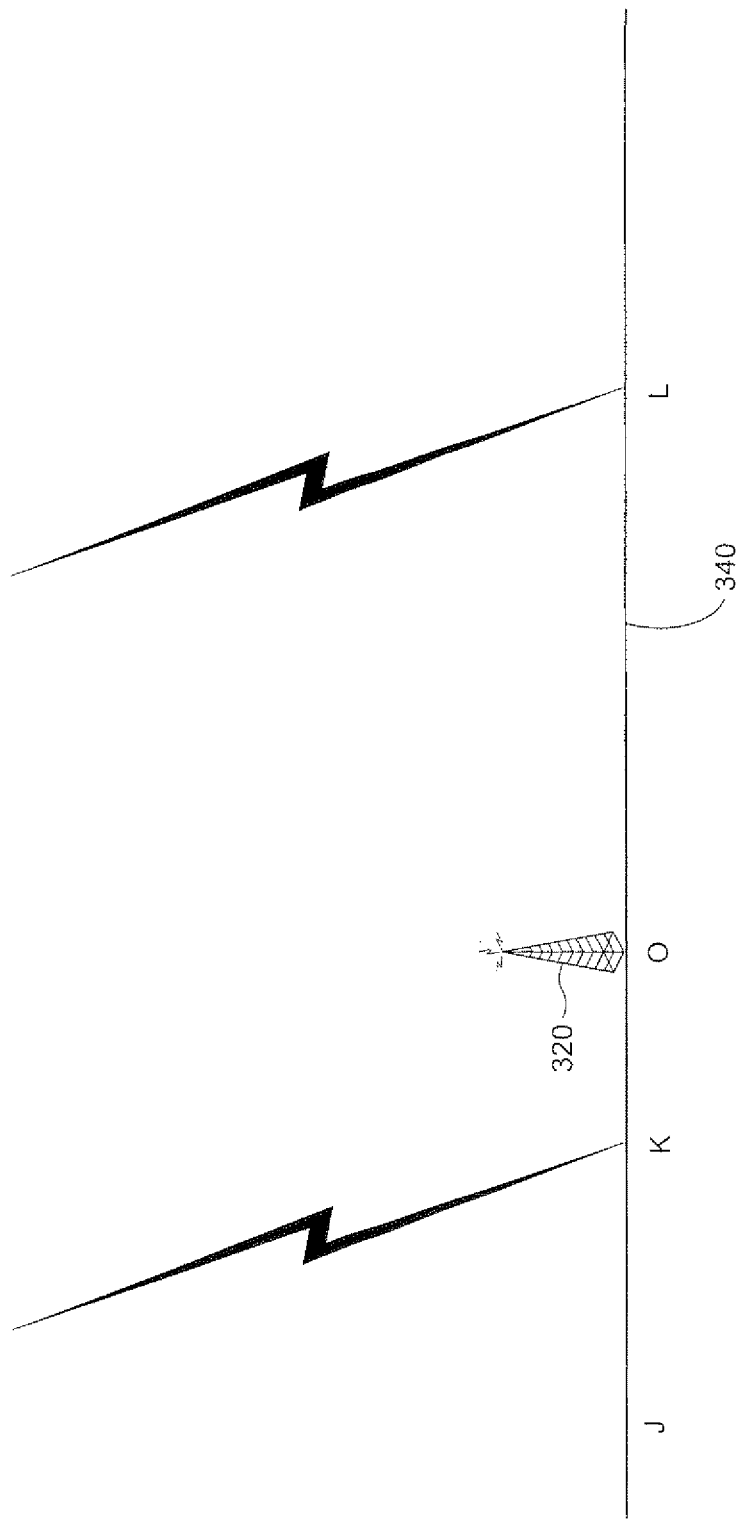

SAME FREQUENCY SATELLITE TERRESTRIAL RADIO BROADCAST

RELATED APPLICATION

This application claims the priority and benefit of U.S. provisional patent application 60/924,672 entitled "SAME-FREQUENCY SATELLITE TERRESTRIAL RADIO BROADCAST" filed May 25, 2007, which is incorporated herein by reference in its entirety.

TECHNICAL FIELD

The technology is related to providing satellite/terrestrial spatial diversity transmissions on a same frequency by using timing and synchronization arrangements.

BACKGROUND

Two satellite/terrestrial radio systems currently serve the USA—Sirius Radio ("Sirius") and XM Radio ("XM"). Each is allocated a 12.5 MHz frequency spectrum by the Federal Communications Commission ("FCC") as illustrated in FIG. 1. Sirius divides its spectrum into three equal portions each of which is slightly less than 4.2 MHz. Two portions are allocated to two satellites and one portion is allocated to terrestrial (ground based) repeaters. XM divides its spectrum into three portions as well, but allocates a greater portion to the terrestrial repeaters as compared to the satellites.

In both Sirius and XM, fixed or mobile receivers receive the desired program by three paths—two satellite paths and one ground path—by using receivers capable of tuning to multiple respective frequencies and connected in a diversity configuration. A reception of any one signal alone guarantees reception of the desired program. Division of the spectrum between the three paths reduces the amount of programming that can be transmitted since the same program must be carried by three frequency signals—two satellite and one terrestrial—to guarantee reception via a reception of a single signal. This also increases the complexity of the receivers since they must be able to tune to multiple frequency signals in search of a program. The increase in complexity also increases the price of the receivers.

SUMMARY

To increase broadcast capacity using multiple transmitters, it is desirable to use the entirety of the available spectrum instead of dividing the spectrum into multiple portions and repeating the broadcast (program) information in each portion. In one or more non-limiting example embodiments that maximizes the transmission capacity, a digital wireless broadcast system includes a plurality of ground stations and a satellite.

Each ground station wirelessly transmits to a corresponding service area a digital symbol stream over a frequency spectrum. The satellite also wirelessly transmits the same digital symbol stream over the same frequency spectrum to the plurality of service areas. Within each service area, the digital symbol stream from the corresponding ground station and from the satellite arrive within a predetermined time period of each other. The predetermined time period is a relative delay between the digital symbol stream from the satellite and from the ground station that is within a range for which the receiver is capable of decoding the digital symbol stream. The relative delay may be measured in symbol periods. It is preferred that a timing of transmission from one ground station be independently controllable from a timing of transmission from another ground station.

It is preferred that the digital symbol stream from the ground station be timed nominally to arrive in advance of the digital symbol stream from the satellite within the service area. To accomplish this, programming information related to the symbol stream should be available to the plurality of ground stations prior to the satellite transmitting the symbol stream to the service areas. In a non-limiting example embodiment, the corresponding programming information is provided to the ground stations from the satellite over a different frequency spectrum or is available from a source other than the satellite.

A ground station can transmit the digital symbol stream omnidirectionally in azimuth. Another ground station can transmit the stream in a shaped pattern so as to have varied shapes for the service area. The service area is preferred to be shaped asymmetrically elongated in a direction away from the satellite. Non-limiting example shapes include an elongated hexagon, a compressed hexagon and a rectangle. The service area can be divided into a plurality of sectors. It is preferred that the ground station be such that a timing of the digital symbol stream transmitted to one sector is independently controllable relative to a timing of the digital symbol stream transmitted to another sector. The sizes and/or shapes of the sectors closer to the satellite can be different from the sectors further from the satellite within the service area. At borders between services areas, the digital symbols from the respective ground stations are timed to arrive within a small, specified number of modulation periods of each other.

In a non-limiting example embodiment, another (second) satellite transmits the digital symbol stream to the service areas using another (second) frequency spectrum. It is preferred that the ground station also be able to transmit the digital symbol stream using the same second frequency spectrum in addition to the using the first frequency spectrum. The ground station can be the same ground station mentioned in connection with the first satellite or can be a different ground station, thus providing both ground station and satellite diversity. The digital symbol stream over the second frequency spectrum from the ground station and the second satellite arrive to the receiver in the service area within the predetermined time period of each other.

Another non-limiting example embodiment of a digital wireless broadcast system includes first and second satellites and both satellites transmit a digital symbol stream over a frequency spectrum to a service area. The digital symbol stream from the first and second satellites arrive to a receiver in the service area within a predetermined time period of each other. Where there are multiple service areas, the first and second satellites can transmit the digital symbol stream to each area using a frequency spectrum or time slot corresponding to the service area, in order to reduce the size of the service area and thus the maximum delay differential that the receiver must handle. Alternatively, the first and second satellites can be used to transmit the digital symbol stream to each area using different directed beams, different time slots, and/or different polarizations corresponding to each service area.

A non-limiting example of a digital wireless broadcast method is disclosed. The method includes transmitting a digital symbol stream using both a plurality of ground stations and a satellite over a same frequency spectrum. The digital symbol stream from each ground station is synchronized to arrive within a predetermined time period of the satellite signal received in a corresponding service area. The predetermined time period is a relative delay between the digital symbol stream from the satellite and from the ground station that is within a, range for which the receiver is capable of decoding the digital symbol stream. The relative delay may be measured in symbol periods.

It is preferred that the digital symbol stream from the ground station be timed nominally to arrive in advance of the digital symbol stream from the satellite within the service area. The method can also includes providing programming information corresponding to the digital symbol stream to the ground station from the satellite over a different frequency spectrum or from a source other than the satellite.

The digital symbol stream from a ground station can be transmitted omnidirectionally in azimuth or in a shaped pattern so as to have varied shapes for the service area. A service area can be shaped to be asymmetrical elongated in a direction away from the satellite. Also the service area can be divided into a plurality of sectors. The digital symbol stream transmitted to at least one sector can be independently controlled relative to a timing of the digital symbol stream transmitted to another sector of the service area. The sizes and/or shapes of the sectors closer to the satellite can be different from the sectors further from the satellite within the service area. At borders between services areas, the digital symbols from the respective ground stations are timed to arrive within one modulation period of each other.

In another non-limiting example method, the digital symbol stream can be transmitted using a second satellite over a second frequency spectrum. The same second frequency spectrum can also be used by a ground station to transmit the digital symbol stream. The ground station can be the same ground station as mentioned to be operating in the first frequency spectrum in connection with the first satellite or can be a different ground station The digital symbol stream over the second frequency spectrum from the ground station and the second satellite arrive to the receiver in the service within the predetermined time period of each other.

Another non-limiting example of a digital wireless broadcast method includes transmitting the digital symbol stream from first and second satellites over a same frequency spectrum to a service area. The digital symbol stream from the first and second satellites arrive to a receiver in the service area within the predetermined time period of each other. Where there are multiple service areas, the first and second satellites are used to transmit the digital symbol stream to each area using a frequency spectrum or time slot corresponding to the service area. Alternatively, the first and second satellites are used to transmit the digital symbol stream to each area using different directed beams, different time slots, and/or different polarizations corresponding to each service area.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIGS. 2B and 2C illustrate a side and top views of a non-limiting example service area;

FIGS. 3B and 3C illustrate a side and top views of another non-limiting example service area;

DETAILED DESCRIPTION

In the following description, for purposes of explanation and not limitation, specific details are set forth such as particular architectures, interfaces, techniques and so on to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "Processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
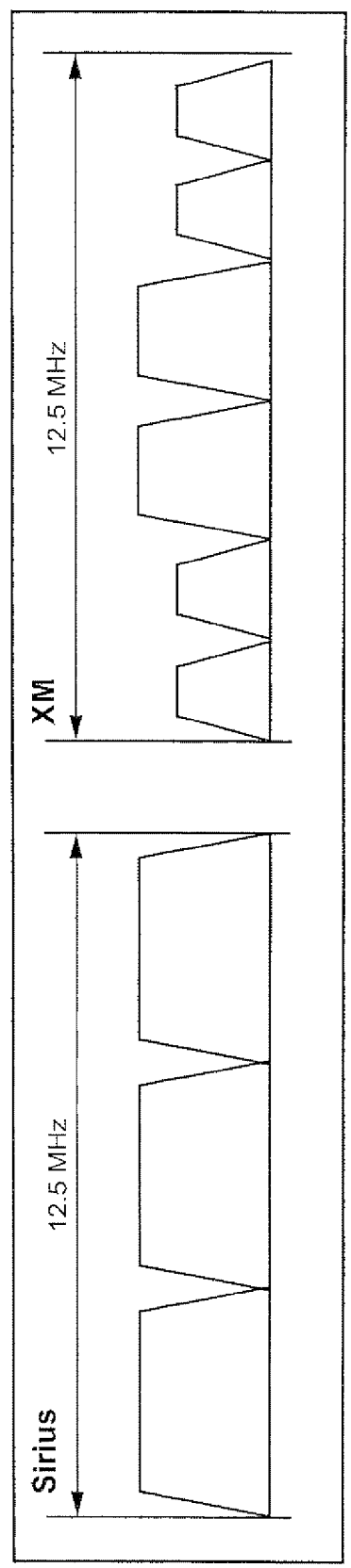
FIG. 1 illustrates frequency spectrums conventionally employed by XM and Sirius.
Figure 2A:
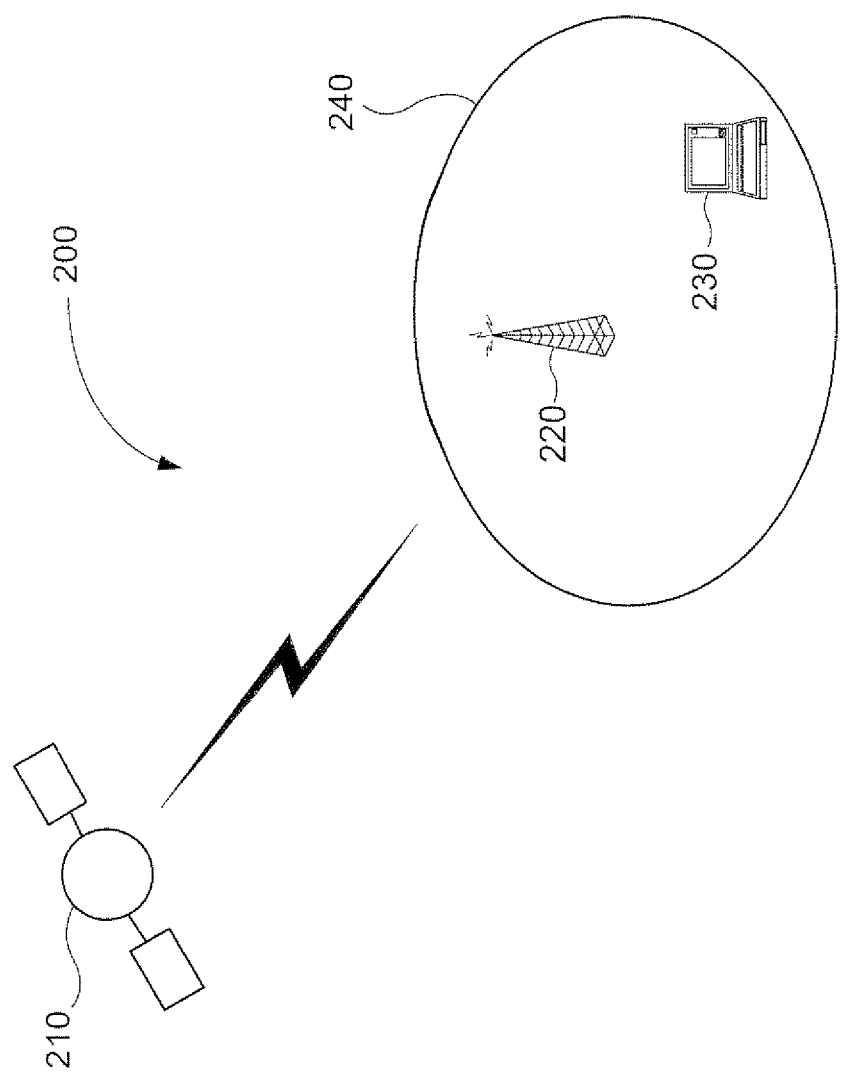
FIG. 2A illustrates an example non-limiting embodiment of a digital wireless broadcast system with one satellite and one ground station.

FIG. 2A illustrates a non-limiting example system to provide satellite/terrestrial same-frequency broadcast. The system includes a satellite 210 and a ground station 220. Both the satellite 210 and the ground station 220 provide digital wireless broadcast services to a receiver 230 located within a terrestrial service area 240 (or simply service area) served by the ground station 220. The satellite 210 and the ground station 220 both broadcast a same digital symbol stream over a same frequency spectrum (i.e., a same carrier channel). For clarity, the symbol stream transmitted by the ground station 220 will be referred to as the terrestrial signal and the symbol stream transmitted by the satellite 210 will be referred to as the satellite signal. In FIG. 2, the terrestrial signal and the satellite signal are both carried over the same frequency spectrum.

In this scenario, spatial diversity can be used to decode the digital symbol stream. The amount of relative delay, which can be measured in symbol periods, between the satellite and terrestrial signals should be within a tolerance range of the receiver 230 for an efficient decoding to take place. For example, the relative delay would preferably be within a number of symbols delay spread for which an equalizer using Maximum Likelihood Sequence Estimation (MLSE) can be adapted, e.g. in the region of 5 symbol periods. This will be further explained below.

For simplicity of explanation, the system in FIG. 2A includes a single satellite 210 and a single ground station 220. However, systems with multiple satellites and/or multiple ground stations (with corresponding multiple services areas) are contemplated. Also contemplated are systems with multiple receivers within the system as a whole and also within any particular service areas.

Figure 2C:
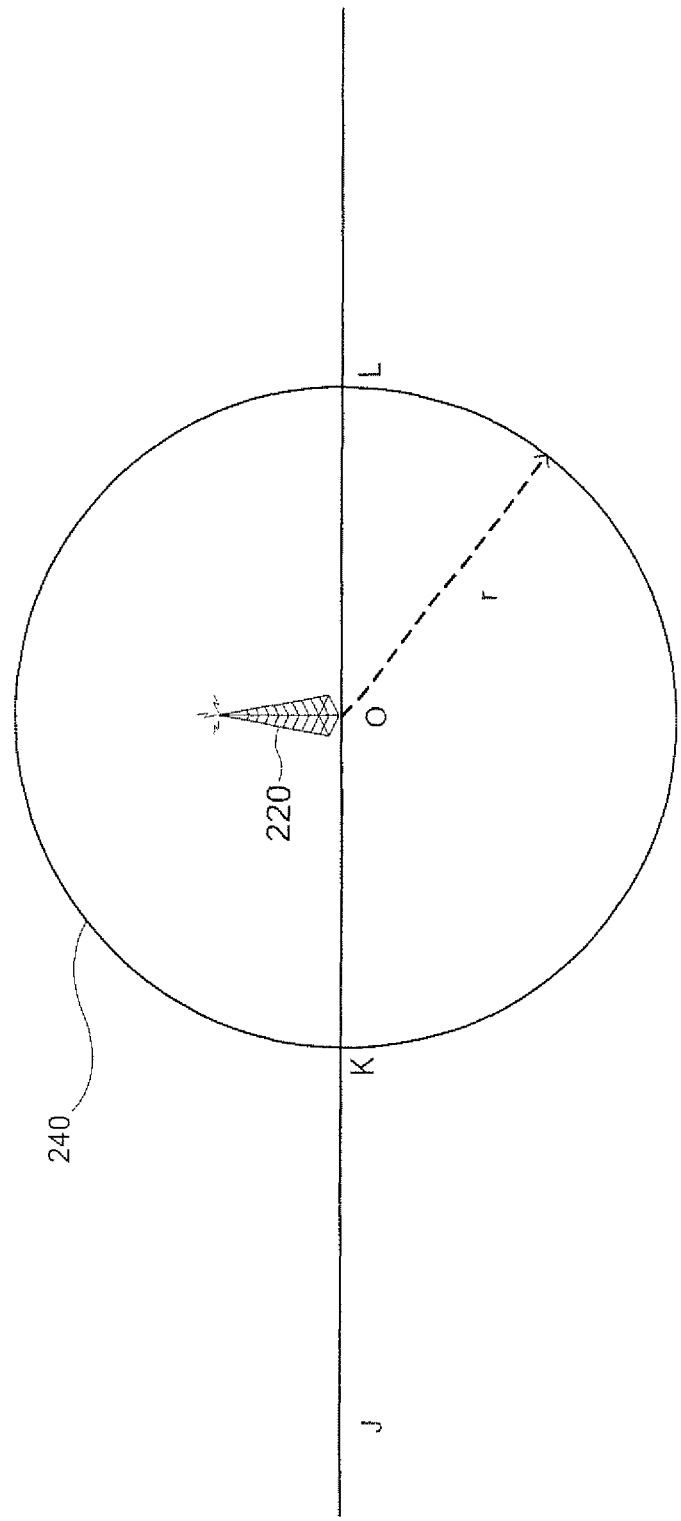

FIGS. 2B and 2C illustrate side and top views of the service area 240, respectively. For simplicity, the receiver 230 and the satellite 210 are omitted. The service area 240 is served by the ground station 220. Line JKL represents an azimuthal direction in which the satellite 210 lies. θ represents an angle of elevation of the satellite 210. See FIG. 2B.

The satellite 210 is assumed to be geostationary. As such, the length of the line segment KL, which can represent a diameter of the service area 240, is assumed to be much smaller than the height of the satellite 210. Then θ can be taken as the angle of elevation of the satellite 210 as seen from anywhere within the service area 240 without sacrificing much accuracy. Point O defines a location directly under the ground station 220.

For the purposes of this disclosure, points "left" are assumed to be closer to the satellite relative to points "right". Then point K is nearer to the satellite 210 than point O by an amount substantially equal to r cos θ where r is a radius of the service area 240. Point L is further from the satellite 210 than point O by an amount also substantially equal to r cos θ. Also for the purposes of this disclosure, points "above" and "below" describe points (i.e., locations) within a service area that lie on one side or the other of the azimuthal line defined by the satellite and the ground station. In FIG. 21B, the service area 240 is divided to portions above and below by the line segment KOL.

If the ground station 220 transmits the same terrestrial signal around all 360 degrees of azimuth—i.e., transmits omnidirectionally—the relative time delay between the satellite and terrestrial signals will be different at different points within the service area 240 with extremes occurring at points K and L. The ground station 220 can be controlled to time the terrestrial signal transmission such that the terrestrial signal is synchronized with the satellite signal for receivers at point O, i.e., the relative delay of the digital symbol streams from the ground station 220 and from the satellite 210 is substantially zero at point O. When this occurs, the satellite signal will be advanced relative to the terrestrial signal at point K by an amount $$\frac{r}{c}(1+\cos\theta)$$

and will be delayed at point L by an amount $$\frac{r}{c}(1-\cos\theta),$$

where c is the speed of light,

To make the relative timing differences between the satellite and terrestrial signals at points K and L same in magnitude and substantially equal to $$\frac{r}{c}\cos\theta \text{ and } \frac{-r}{c}\cos\theta,$$

respectively, the timing of the terrestrial signal transmission can be advanced by the amount substantially equal to $$\frac{r}{c}$$

relative to the satellite signal as it would be received at point O. With this advance, the relative timing difference between the satellite and terrestrial signals is greatest at point O—at the location of the ground station—and is substantially equal to $$\frac{r}{c}.$$

Thus, if the duration $$\frac{r}{c}$$

is within the relative delay tolerance range of the receiver 230, then the receiver 230 will be able to decode the symbol stream efficiently anywhere within the service area 240. The tolerance range of the receiver 230 can be expressed in symbol periods, and the duration $$\frac{r}{c}$$

can be appropriately translated.

Figure 2D:
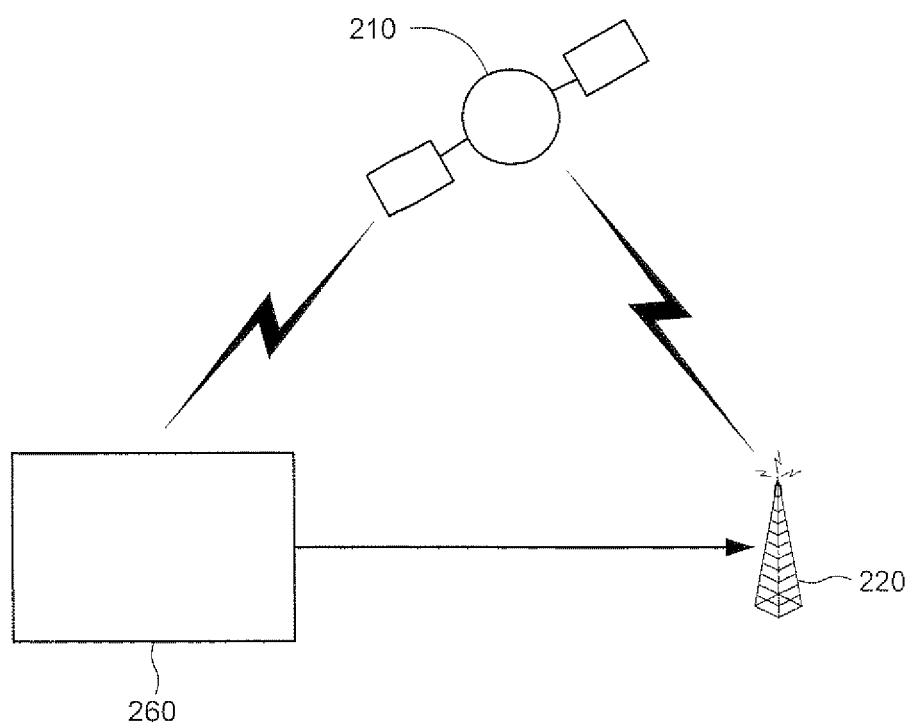
FIG. 2D illustrates a non-limiting example programming source embodiment.

To provide the timing advance, the ground station 220 can receive programming information for transmission to the receivers from a programming source 260 other than the satellite 210 as illustrated in FIG. 2D. Examples include receiving the programming information from the source 260 over a microwave link, a terrestrial cable, a fiber, etc. In another embodiment, the ground station 220 can receive the programming information carried over a separate channel (different frequency spectrum) from the satellite 210 in advance of the satellite 210 transmitting the symbol stream intended for the receivers 230.

In digital communication systems, equalizers can be used to process multiple copies of a same symbol stream delayed relative to each other received at a receiver. In the realm of cell phones, the signal copies can arise through echoes or reflections from large objects, or by deliberately transmitting the signal from multiple sites. To achieve a diversity benefit, a small time shift of the signals is more advantageous than signals that are perfectly synchronized at the receiver.

In the context of a satellite/terrestrial broadcast system, the equalizer in the receiver is preferred to function with the greatest timing difference encountered over the service area, namely $$\frac{r}{c}$$

in the above example. For this to occur, the quantity $$\frac{r}{c}$$

should be within the tolerable differential delay range of the receiver The differential delay may be measured in symbol periods or in time amounts.

A typical equalizer of reasonable complexity, as used in cell phones conforming to the Global System for Mobile communications (GSM) standard, has the capability to handle signals with relative delays up to 5 modulation symbols. In GSM, the modulation symbols are of 3.69 uS duration, so a 5-symbol delay is 18.46 uS, or 5538 meters at the speed of light c.

If the terrestrial signal is advanced by 5 symbol periods relative to the satellite signal at the ground station (point O), then at some distance to the left, on the order of 5 Km, the ground signal will be delayed by 5 symbol periods relative to the satellite signal, but still with a relative delay within the ±5 symbol periods to which the equalizer can adapt. This will also occur a some point a much greater distance to the right of point O. Thus, the radius of the service area 240 can be of the order of 5 Km towards the satellite and greater away from the satellite resulting in a service area adequate for many coverage situations such as an urban area.

It is also desired that, on the edge of service areas of two ground stations, each ground station synchronized similarly to the satellite signal at respective sites, the receiver should receive signals from both ground stations within the same equalizer delay spread, and, as explained further below, may be assisted by using a different ground station timing advance for signals broadcast in the direction away from the satellite as compared to signals broadcast in directions toward the satellite.

In a non-limiting example embodiment, individual programs (music, talk, etc.) are transmitted each on its own frequency channel (carrier). Each carrier may be transmitted both from the satellite 210 and from the ground station 220. Preferably, the terrestrial signal is time-advanced relative to the satellite signal as it would be received at point O in FIGS. 2B and 2C. This minimizes the relative delay between the satellite and terrestrial signals as experienced by receivers at the edge of the service area 240.

Figure 3A:
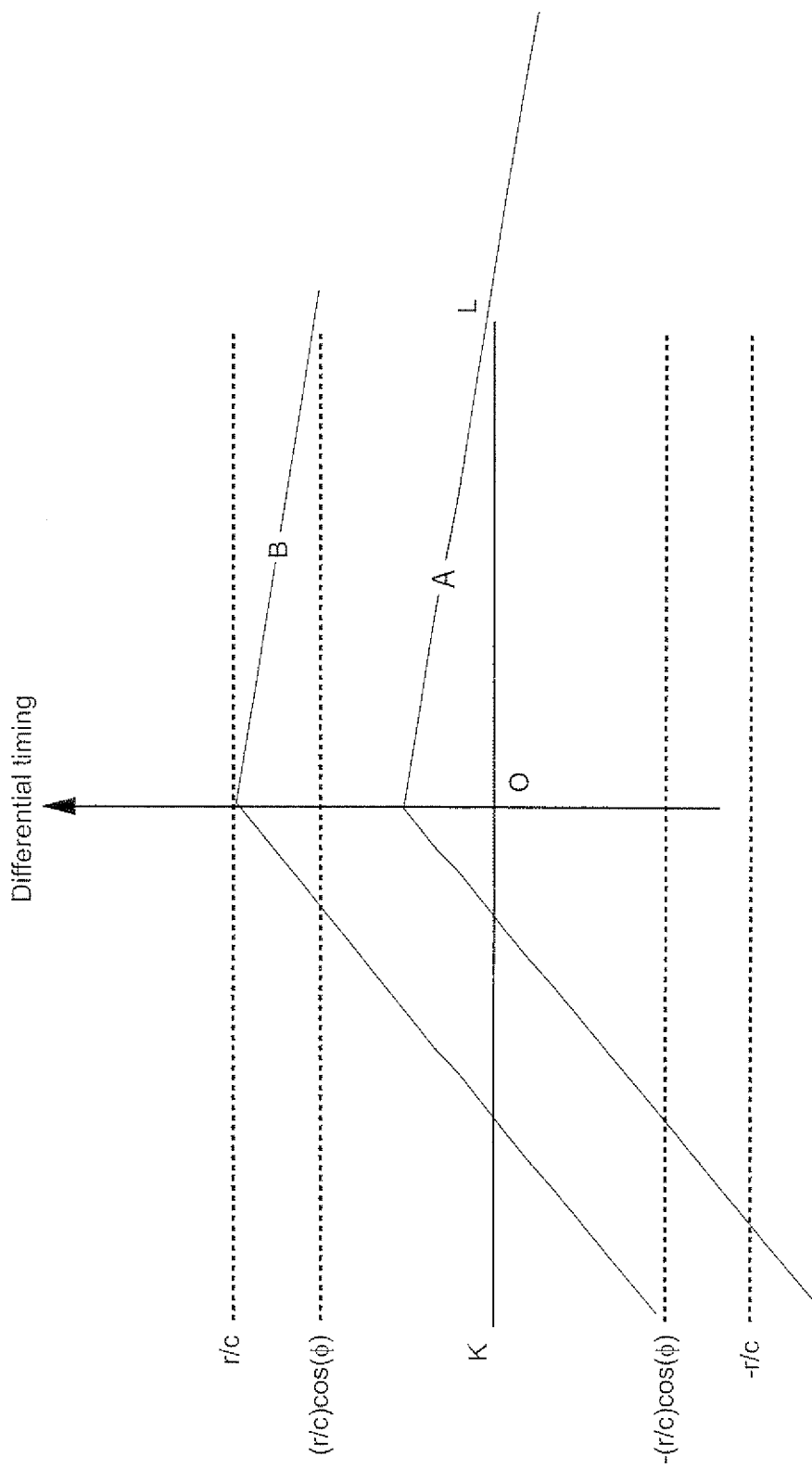
FIG. 3A illustrates an example non-limiting variance of a differential delay between satellite and terrestrial signals across a service area.

FIG. 3A illustrates an example variation in the differential delay between the satellite and terrestrial signals across a diameter of the service area 240 (i.e., a cell) of the ground station 220. Curve B represents the differential delay experienced along the line segment KL when the terrestrial signal is advanced at point O relative to the satellite signal by the amount $$\frac{r}{c}.$$

See also FIGS. 2B and 2C.

At the left edge of the service area 240 (point K), the terrestrial signal is advanced relative to the satellite signal by an amount $$\frac{-r}{c}\cos\theta.$$

That is, at point K, the digital symbol stream from the satellite 210 actually arrives ahead of the digital symbol stream from the ground station 220 by the amount $$\frac{r}{c}\cos\theta.$$

At the right (point L) the terrestrial signal is advanced relative to the satellite signal by $$\frac{r}{c}\cos\theta.$$

Beyond point L, the relative advance becomes smaller still until at some point much further to the right, the satellite signal becomes advanced relative to the terrestrial signal.

Note that the rate of differential delay decays at a smaller rate to the right of the ground station 220 (in the direction away from the satellite) than to the left. If the service area 240 is limited only by the differential delay, it can be seen that the differential delay is asymmetrical, extending much further to the right (away from the satellite) than to the left (toward the satellite) relative to the ground station 220.

Figure 3C:
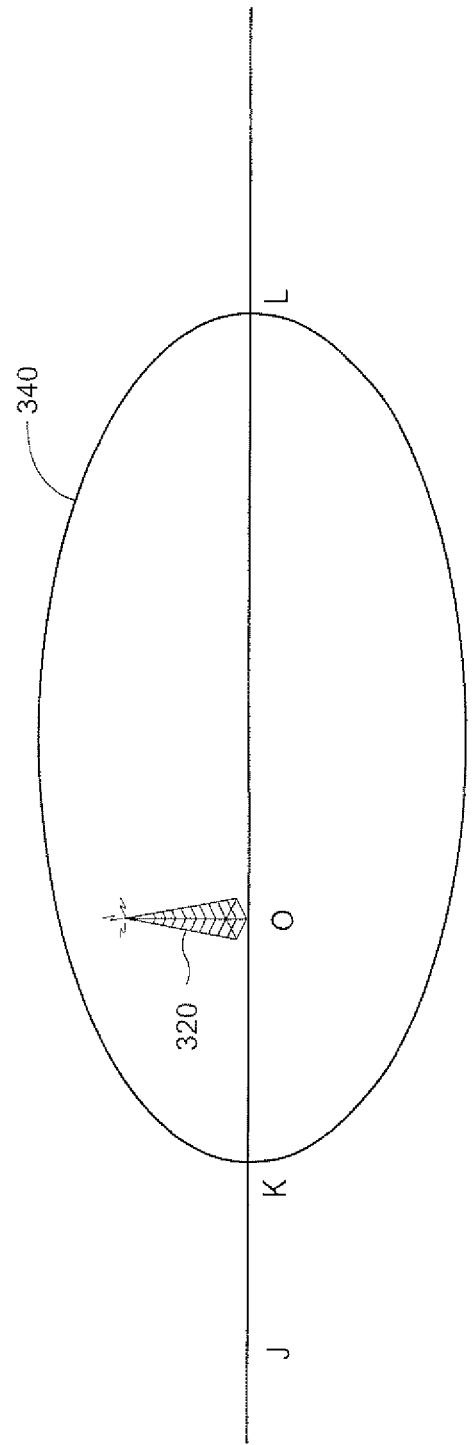

In a non-limiting embodiment, this asymmetrical phenomena is exploited by providing a ground station service area—a cell—that is asymmetrical with terrestrial signals having more energy in the direction away from the satellite, and less energy in the direction towards the satellite. This is illustrated in FIGS. 313 and 3C which illustrate side and top views, respectively, of a service area 340. The service area 340 is elongated to the right relative to the ground station 320. More energy in the direction away from the satellite provides a longer useful range. This can be accomplished by the ground station 320 beaming the terrestrial signal in a shaped pattern, which can be accomplished using one or more antennas.

Figure 4:
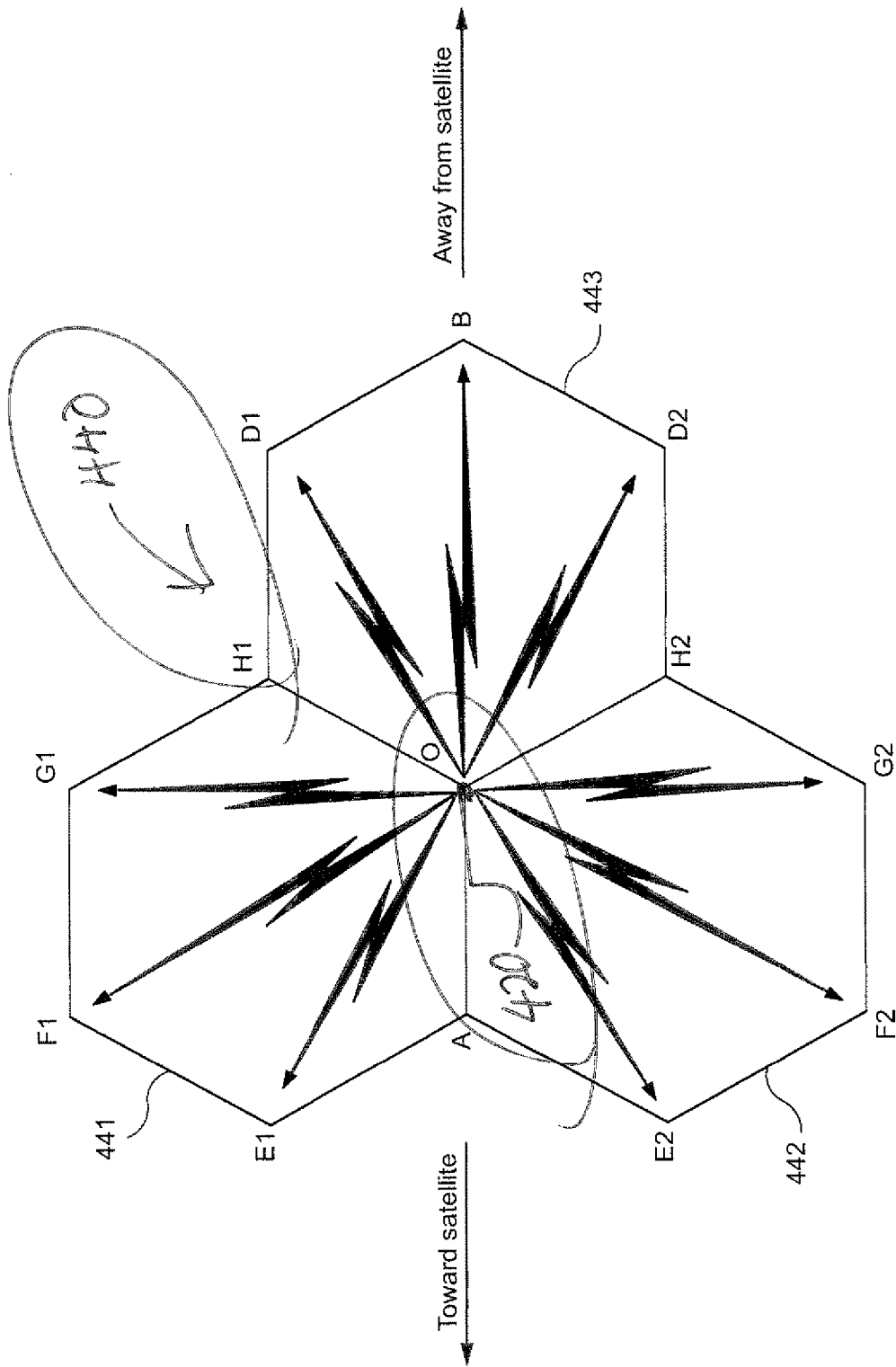
FIG. 4 illustrates a geometry of an example non-limiting three-sector service area.

In a non-limiting alternative, the service area of the ground station can be divided into sectors. FIG. 4 illustrates a geometry of an example service area 440 divided into first, second and third sectors 441, 442 and 443 as viewed from above. The service area 440 can be accomplished with a ground station located at point O having three antennas for example, with each antenna covering a nominal beam width of substantially 120 degrees and covering substantially a 120-degree sector of azimuth. Any number of sectors, or antennas are contemplated.

Sectors can be represented as having a hexagonal shape as illustrated in FIG. 4. Taking the first sector 441 as an example, the distance from the ground station 420 (from point O) to the furthest vertex F1 of the hexagon 441 is twice the distance to the nearer vertices A and H1. The sector antenna pattern only need radiate approximately $\frac{1}{16}^{th}$ of the energy towards the nearer vertices A and H1 (which lie at ±60 degrees relative to a center of the sector) as compared with the sector center (toward F1) due to the $4^{th}$ power of distance terrestrial propagation law. Accordingly, the antenna patterns can be tailored to be nominally 12 dB down at ±60 degrees and their −3 dB beam widths can be on the order of ±30 degrees.

The radiated terrestrial signal can be different for each sector. For example, the terrestrial signal transmitted to the first sector 441 can be independent of the terrestrial signal transmitted to the second or the third sector 442, 443 or both. The terrestrial signals can vary in timing or strength or both.

Figure 5:
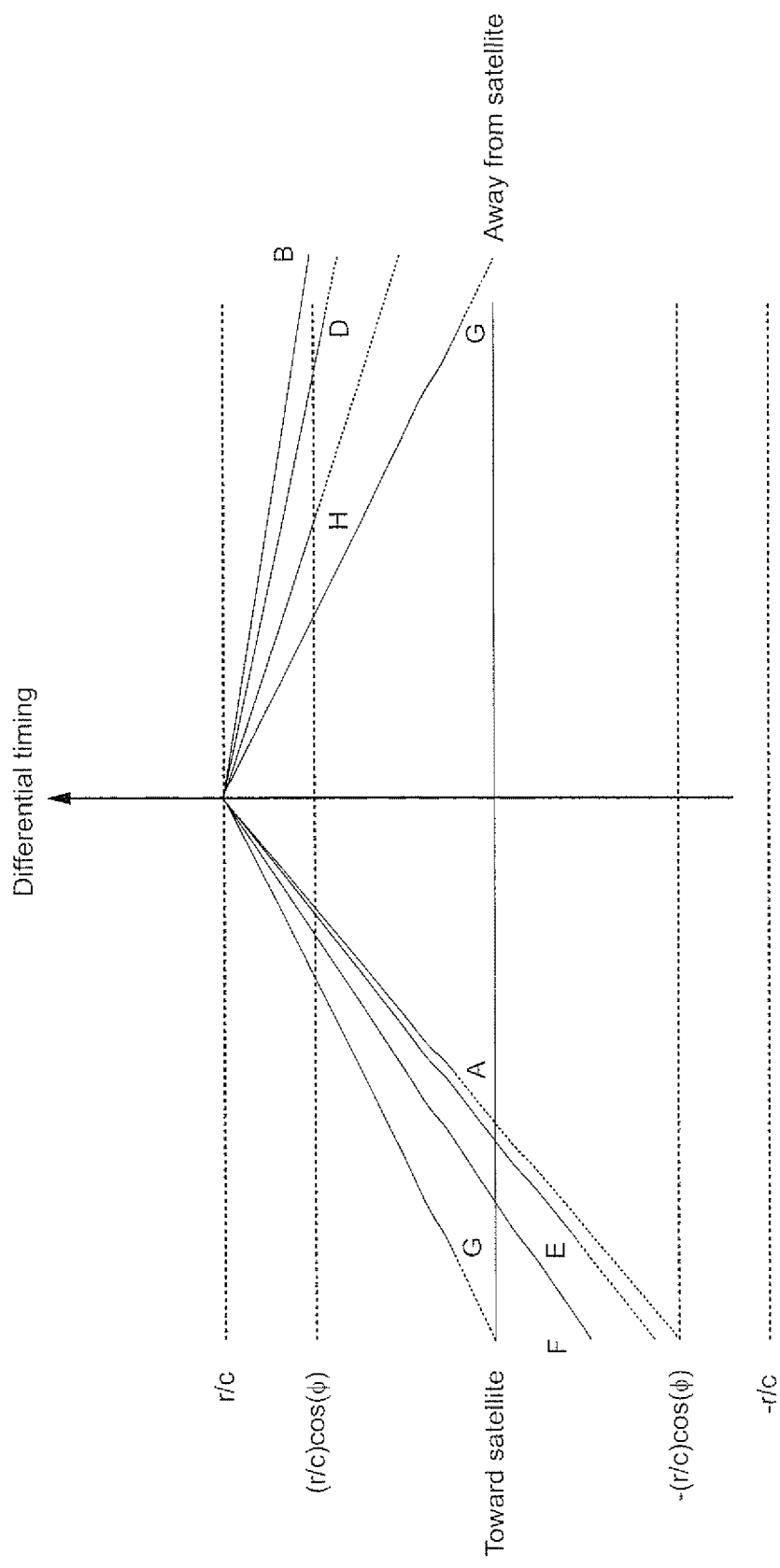
FIG. 5 illustrates an example non-limiting timing variation along different lines from a ground station to each of the vertices of the three three-sector service area.

FIG. 5 is used to explain one or more advantages of having independently controllable terrestrial signals for the sectors. FIG. 5 illustrates an example timing variation along different lines from the ground station 420 to each of the vertices of the hexagons of the three sectors in FIG. 4. The point O in FIG. 4 correlates to the center vertical line in FIG. 5. At this point, terrestrial signal timings are assumed to be advanced for all sectors by $$\frac{r}{c}$$

relative to the satellite signal. Also, r represents a distance from the ground station 420 to a furthest point of the service area 440 such as vertices F1, F2 and B. As noted above, if the quantity $$\frac{r}{c}$$

is within the relative delay tolerance range of the receiver, then the symbol stream can be decoded efficiently by the receiver anywhere within the service area 240. In FIG. 4, the line O-A is the azimuthal direction toward the satellite. Then the terrestrial signal pattern above the azimuthal line is a mirror image of the terrestrial signal pattern below the azimuthal line within the service area 440.

Referring back to FIG. 5, moving towards the satellite from the ground station 420, the satellite signal becomes time advanced while the terrestrial signal becomes delayed. Moving away the satellite from the ground station 420, both the satellite and terrestrial signals become time delayed. As a result, the relative differential delay between the satellite and terrestrial signals declines at a faster rate when moving towards the satellite (to the left) than when moving away from the satellite (to the right) from the ground station 420 at point O.

At certain points, negative differential timing values (below the center line in FIG. 5) occur. This indicates that the satellite signal is actually time-advanced relative to the terrestrial signal at certain locations within the service area 440. With the three-sector geometry illustrated in FIG. 4, this happens at vertices E1 and E2 (corresponding to curve E in FIG. 5) and at vertices F1 and F2 (corresponding to curve F in FIG. 5). This indicates that along line segments defined by points O-E1 and O-F1 in the first sector 441 and points O-E2 and O-F2 in the second sector 442, some portion of the line segments are such that the terrestrial signal is delayed relative to the satellite signal. Since the line segments are within the service area 440 served by the ground station 420, then there are some locations within the service area 440 in which the terrestrial signal is delayed relative to the satellite signal.

At all other vertices, the terrestrial signal is received in advance (or substantially at the same time) relative to the satellite signal such as at vertices H1 and H2, D1 and D2 and B (corresponding to curves H, D and B, respectively, in FIG. 5).

Further complicating the situation is that the terrestrial signal propagation can be characterized by multi-path reflections where echoes of the signal are received over a longer than the line-of-sight path. If the satellite signal is time-advanced relative to the line-of-sight path, the total delay spread from earliest ray to latest ray would be greater than the terrestrial delay spread, which can be undesirable To lessen the likelihood of the total delay spread exceeding the terrestrial delay spread, it is preferred that the satellite signal not be advanced relative to the terrestrial signal, i.e., the differential should be brought within the positive differential timing region (above the centerline in FIG. 5). That is, the symbol stream from the ground station 420 is preferred to nominally arrive ahead of, or at least not behind, the symbol stream from the satellite in the service area. One way to achieve this is to increase the amount of timing advance of the ground station signal to bring vertices E1, E2, F1 and F2 into the positive differential timing region, by advancing the timing by an amount greater than $$\frac{r}{c}$$

at point O as long as the advanced timing is within the tolerance the receiver. It is noted that even if the advance amount $$\frac{r}{c}$$

at point O is greater than the equalizer capability, this does not necessarily prevent the receiver from functioning since, at point O, the terrestrial signal is likely to be dominant and the satellite signal may be ignored by the receiver.

Another way avoid the potentially undesirable situation is to use alternative cell geometries so that points vertices E1, E2, F1 and F2 are moved in a direction further away from the satellite (to the right). The result is that in general, the portions of the cell to the left of the ground station is shortened as compared to the portions to the right. Of course, combinations of adjusting both timing advances and cell geometries are contemplated.

Figure 6:
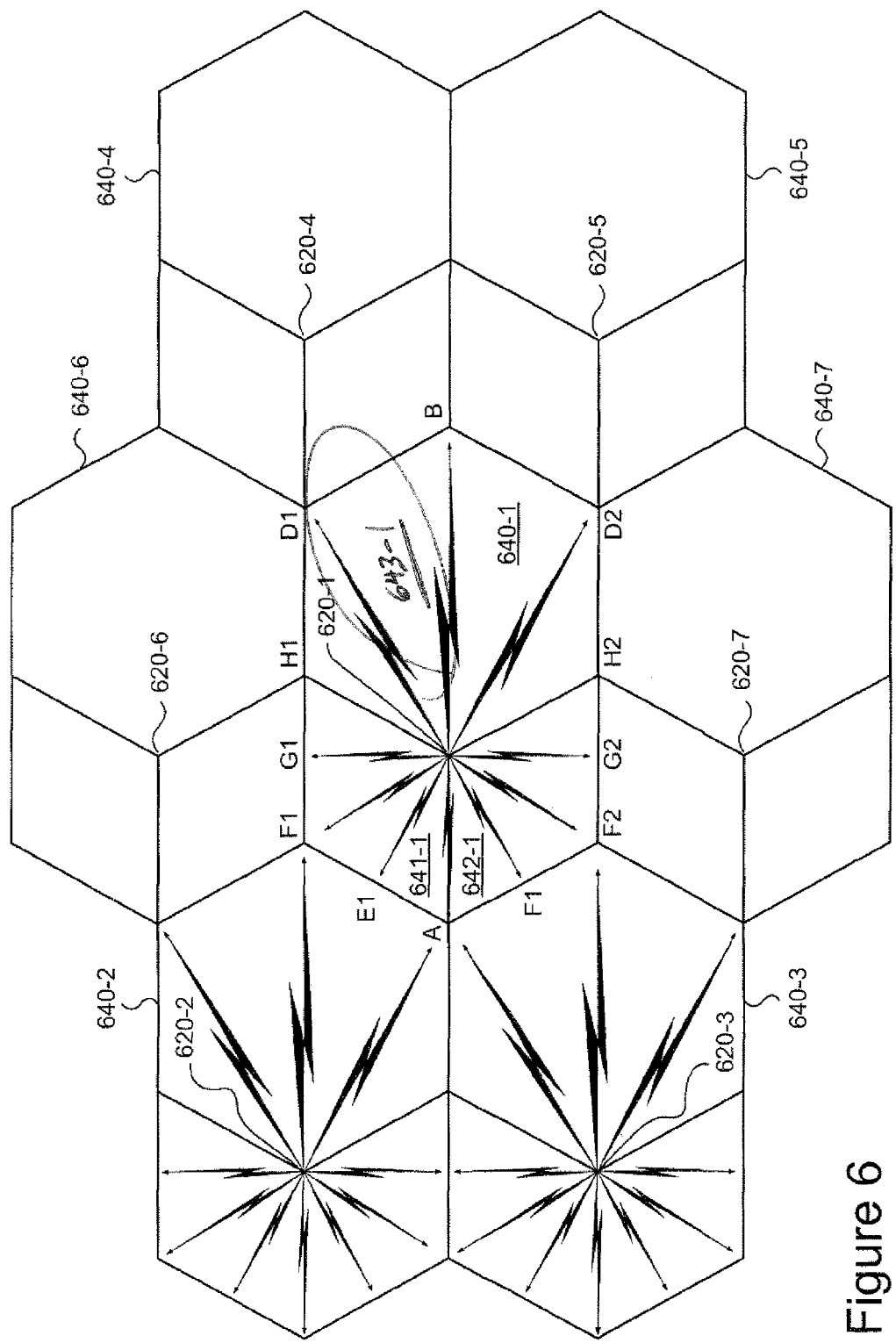
FIGS. 6, 7 and 8 illustrate non-limiting embodiments cell (service area) patterns.

FIG. 6 illustrates an example non-limiting alternate cell geometry. FIG. 6 shows a cell pattern in which alternate columns of hexagons are collapsed into parallelograms resulting in cells (or service areas) 640 with geometries resembling elongated hexagons. The cells 640 each include three sectors 641, 642 and 643. For example, the cell 640-1 resembles an elongated hexagon defined by vertices A, F1, D1, B, D2 and F2. The cell 640-1 is illustrated to include three sectors 641-1, 642-1 and 643-1 with each sector covering substantially 120 degrees azimuth. However, embodiments are contemplated in which the azimuth coverage for the sectors are not all equal.

The cell 640-1 borders cells 640-2 through 640-7, where each cell 640 is served by a respective ground station 620. The shapes of cells 640 are all similar, but this is not a requirement. Embodiments in which the cell shapes and/or sizes are different are contemplated. Within each cell, the digital symbol streams transmitted from the ground station and the satellite arrive within the predetermined time period, i.e., the receiver's tolerance range, of each other. This can be accomplished by independently controlling the transmission times of some or all ground stations.

In the cell 640-1, it is assumed that the corresponding ground station 620-1 serving the cell is located at point 0 where the three sectors meet. That is, the geometry of the cell 640-1 is elongated along the azimuthal line defined by points A and B. As seen, the sectors of the cell 640 lying in a direction away from the satellite relative to the ground station (relative to point O) are of different sizes and/or shapes from the sectors of the cell 640 lying in a direction toward the satellite. Taking the cell 640-1 as an example, the third sector 643-1 is a different shape and size from the first and second sectors 641-1 and 642-1. In general, the sectors lying to the right (i.e., right-firing) of the ground station can be longer and occupy a larger portion of the service area when compared to the sectors lying to the left (i.e., left-firing) of the ground station.

While not strictly necessary, the center of the cell can lie along a line on the azimuth defined by the satellite and the ground station. For example in FIG. 6, the center of the cell 640-1 lies somewhere on the line segment defined by points O and B within the sector 643-1.

The sector 641-1 of the cell 640-1 is a parallelogram (e.g., a rhombus) defined by vertices A, F1, H1 and O. The sector 642-1 is also a parallelogram defined by vertices A, F2, H2 and O. The sector 643-1 is a hexagon defined by vertices H1, D1, B, D2, 142 and O. The sides of the hexagon of the sector 643-1 need not all be of equal length.

In FIG. 6, the points O—which are commensurate with locations of the ground stations 620—serve as a vertex for each of the sectors. The sector 643-1 covers a larger portion of the service area 640 than either sector 641-1 or 642-1, and can cover a larger portion than a combination of the two sectors.

Figure 9:
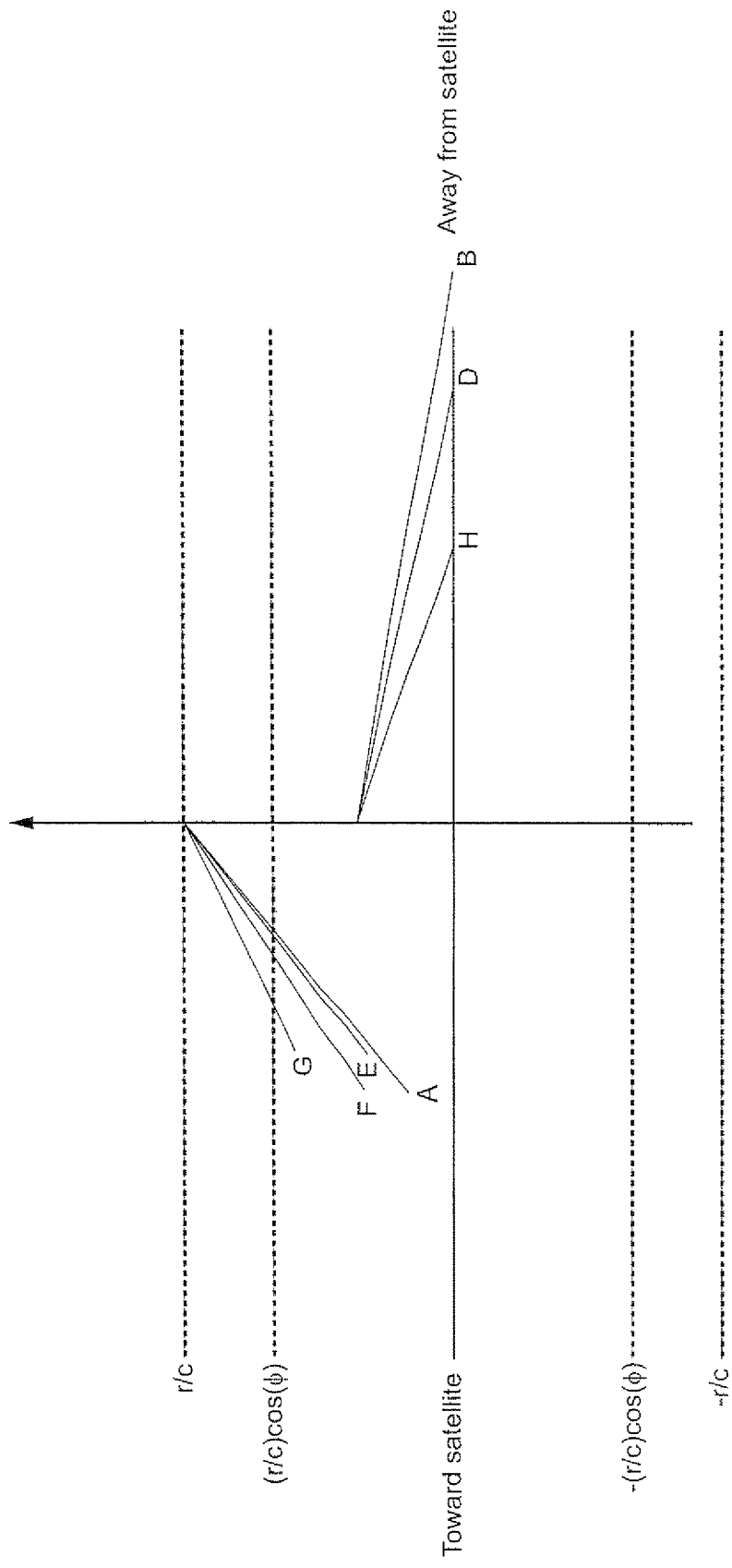
FIG. 9 illustrates a non-limiting timing variation for right and left firing sectors of a cell pattern.

In FIG. 6, points E1, F1, E2 and F2 in the sectors 643-1 and 642-1 are now located to the right of point A. Compare with FIG. 4. Then if the terrestrial signal received at point A is advanced relative to the satellite signal, then it is guaranteed that the terrestrial signal will be advanced relative to the satellite signal at all points within sectors 641-1 and 642-1. This is illustrated in FIG. 9 which clearly indicates that the curves E (corresponding to points E1 and B2 in FIG. 6) and F (corresponding to vertices F1 and F2) both never fall below curve A (corresponding to the vertex A).

In the cell geometry illustrated in FIG. 6, the timing advance for sectors 641-1 and 642-1 can be substantially the same or even identical. In an example non-limiting embodiment, the sectors 641-1 and 642-1 can be merged into a single 240-degree sector using an appropriate antenna pattern. This can reduce the complexity and cost of the ground station serving the cell 640-1 by reducing the number of transmitters and antenna sets from three to two. As mentioned above, the timing advance of the terrestrial signal transmitted to the sector 643-1 can be different from that of the sectors 641-1 and 642-1 as illustrated in FIG. 9. See curves H, D and B as compared to curves A, F, F and G.

Figure 7:
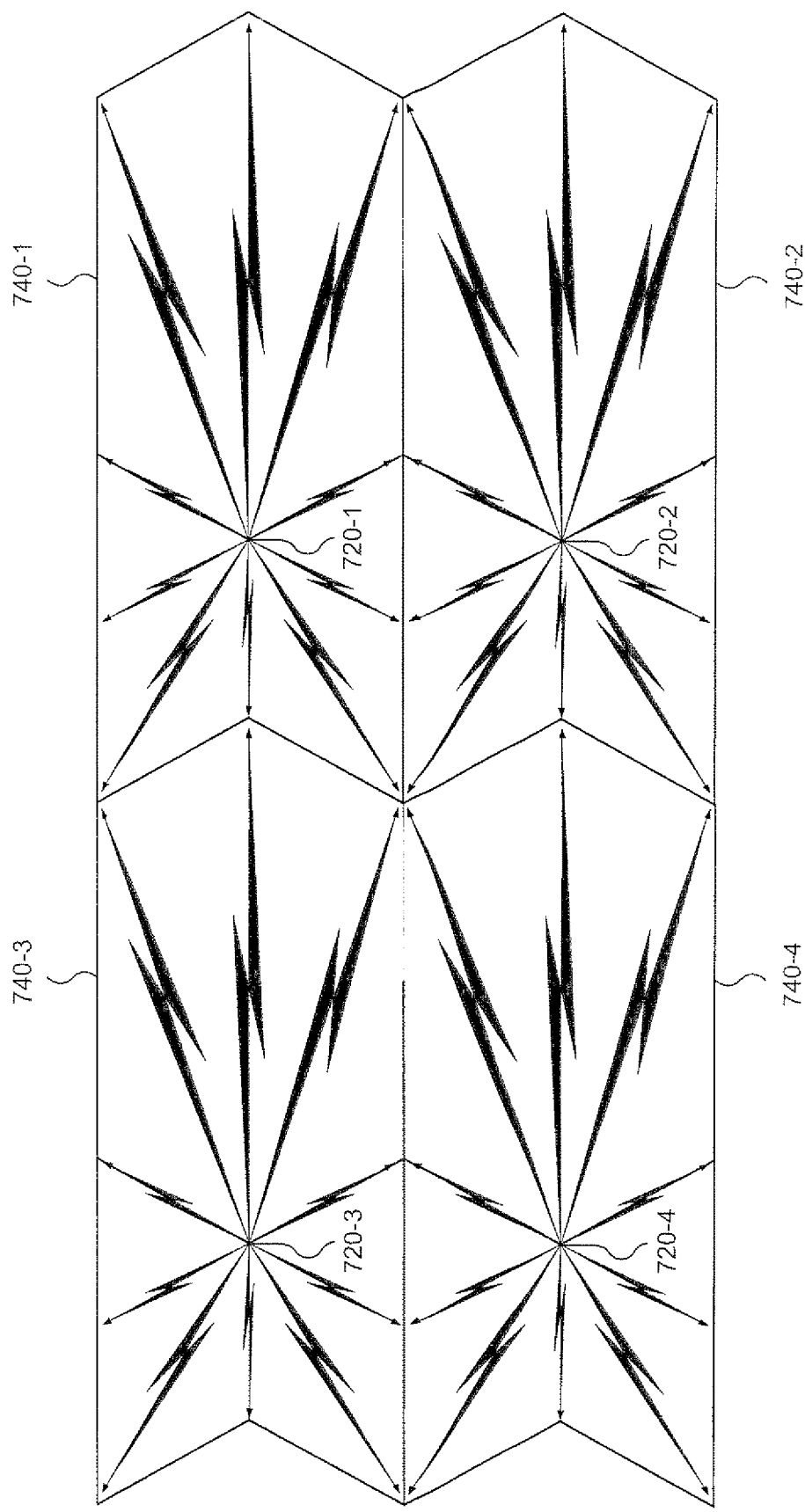
Figure 8:
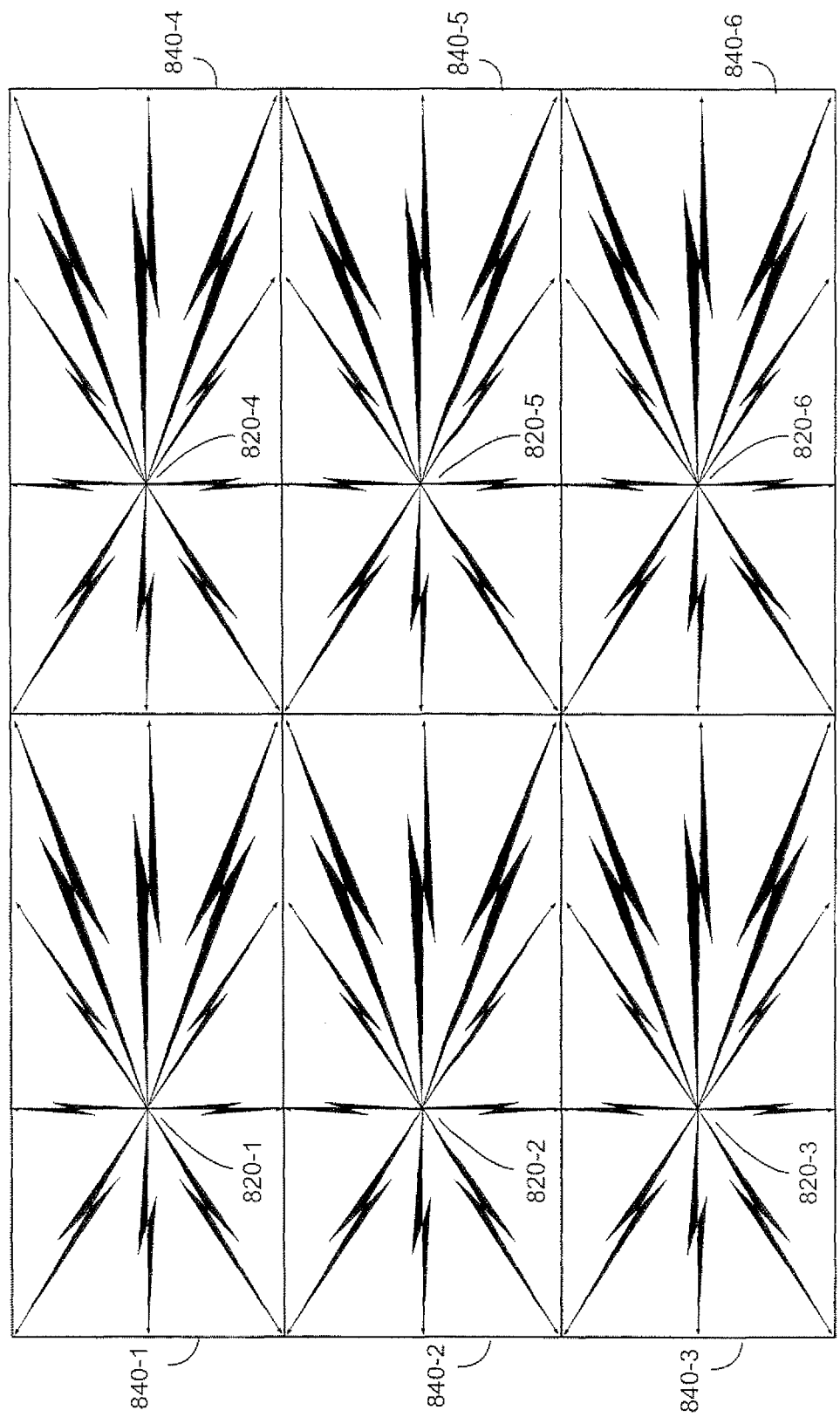

Other modified cell shapes and patterns can be used. For example, FIG. 7 illustrates a non-limiting example of a pattern of cells 740 each served by ground stations 720 where the right-firing hexagonal sectors are elongated to the right while the left-firing hexagonal sectors are compressed. FIG. 8 illustrates yet another non-limiting alternative using rectangular sectors 840 each served by ground stations 820 that are of different lengths to the right and to the left of the ground stations 820 respectively.

In addition to the illustrated non-limiting examples, any geometry that is generally elongated in the direction away from the satellite and compressed in the direction toward the satellite relative to the ground station is contemplated. In addition, the shapes of the cells—the service areas—need not be identical. It is contemplated that the sizes and/or the shapes of the cells can be different.

One of many advantages of maintaining separate right and left firing sectors is that the transmit timing can be chosen independently for each sector so as to achieve optimum terrestrial and satellite signal timing alignments for multiple diversity. For example, FIG. 9 shows that the timing advance of the right-firing sector can be reduced so that points H, D and B experience substantially zero timing differential between the terrestrial and the satellite signal.

Moreover, at vertex A in FIG. 6, the timing of the terrestrials signals received from the left-firing sectors 641-1 and 642-1 from the ground station 620-1 can be made approximately the same as timing of the terrestrial signals received from the right firing sectors of ground stations 620-2 and 620-3, when an account is taken of the difference in timing advance of those ground stations to align them with the satellite timing at their locations in a like manner. As a result, vertex A can receive triple diversity terrestrial signals as well as the satellite signal. Similarly vertex B can also receive triple diversity terrestrial signals from ground stations 620-1, 620-4 and 620-5. In fact, any or all vertices A, F1, D1, B, D2 and F2 can receive multiple diversity terrestrial signals.

To make such diversity as effective as possible, the timing advance of ground stations such as 620-1 and 620-7, which would normally be the same, can be offset slightly so that a border point such as F2 receives the two terrestrial signals with a small symbol timing difference. For example, if the offset is ±0.5 modulation symbol periods, then there would be one symbol timing difference at the border point.

Such a deliberate timing difference is desirable when an equalizer is used to demodulate a multi-path signal. One type of equalizer which provides this desirable characteristic is the Viterbi Maximum Likelihood Sequence Estimator (MLSE). There are many other types of equalizers known and there are also many published refinements to the MLSE equalizer which may be advantageously employed.

Figure 10A:
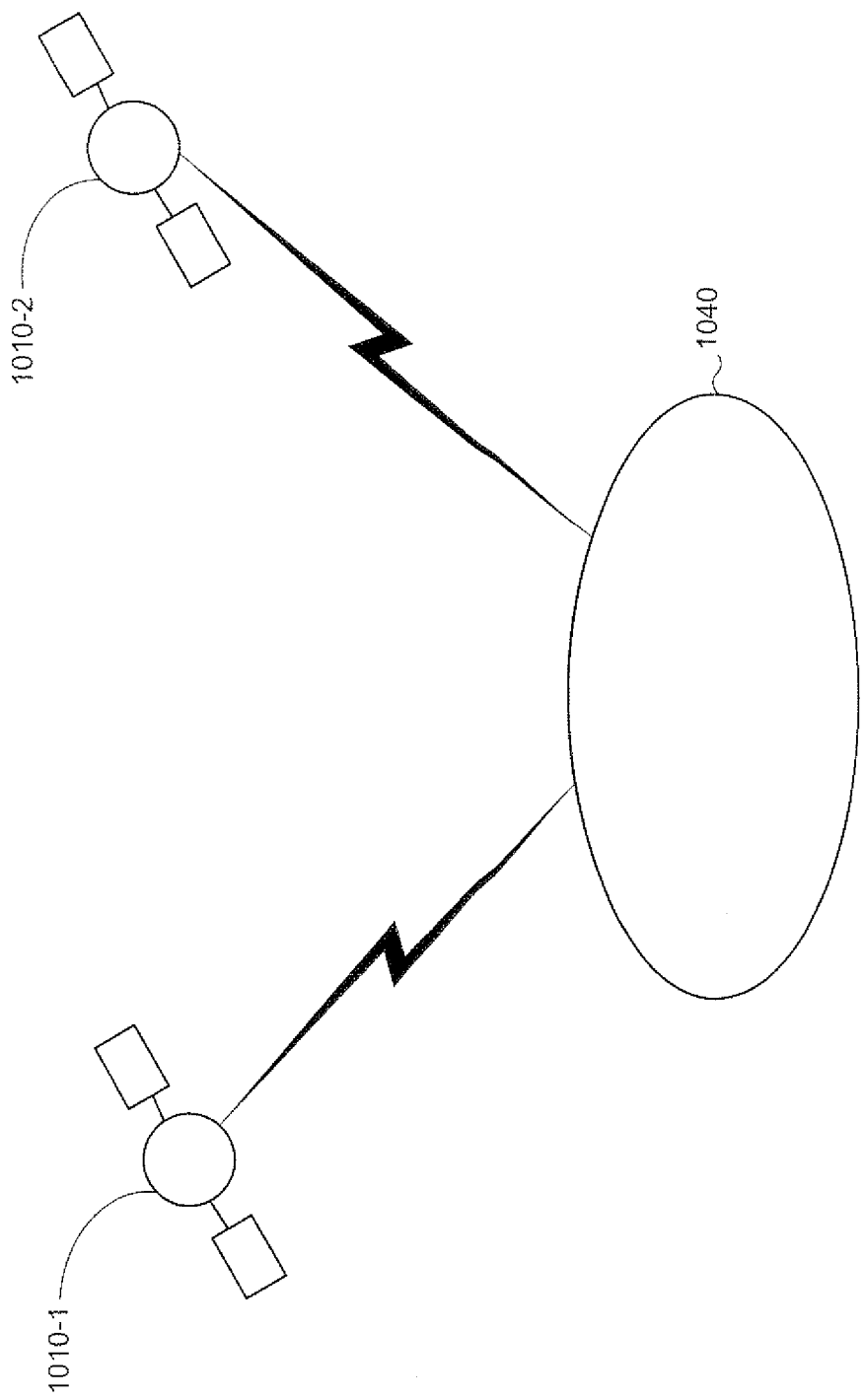
FIG. 10A illustrates a non-limiting example of a digital wireless broadcast system with multiple satellites serving a service area without a ground station.

It is also desirable to provide diversity satellite signals for receivers that are out of range of any ground station. In an example non-limiting embodiment as illustrated in FIG. 10A, the service area 1040 is out of range of any ground stations. In this case, first and second satellites 1010-1 and 1010-2 can provide the same digital symbol stream using respective parts of the frequency spectrum to avoid the need for accurate timing synchronization, as in the case of XM and Sirius satellite systems.

However, in an alternative non-limiting embodiment, the first and second satellites can transmit using the same frequency spectrum to any receiver within the service area 1040. The service area 1040 is preferred to be small enough such that the amount of relative delay measured in symbol periods between the digital symbol stream from the satellites 1010-1 and 1010-2 within the service area 1040 is within a tolerance range of the receiver for an efficient decoding to take place.

Figure 10B:
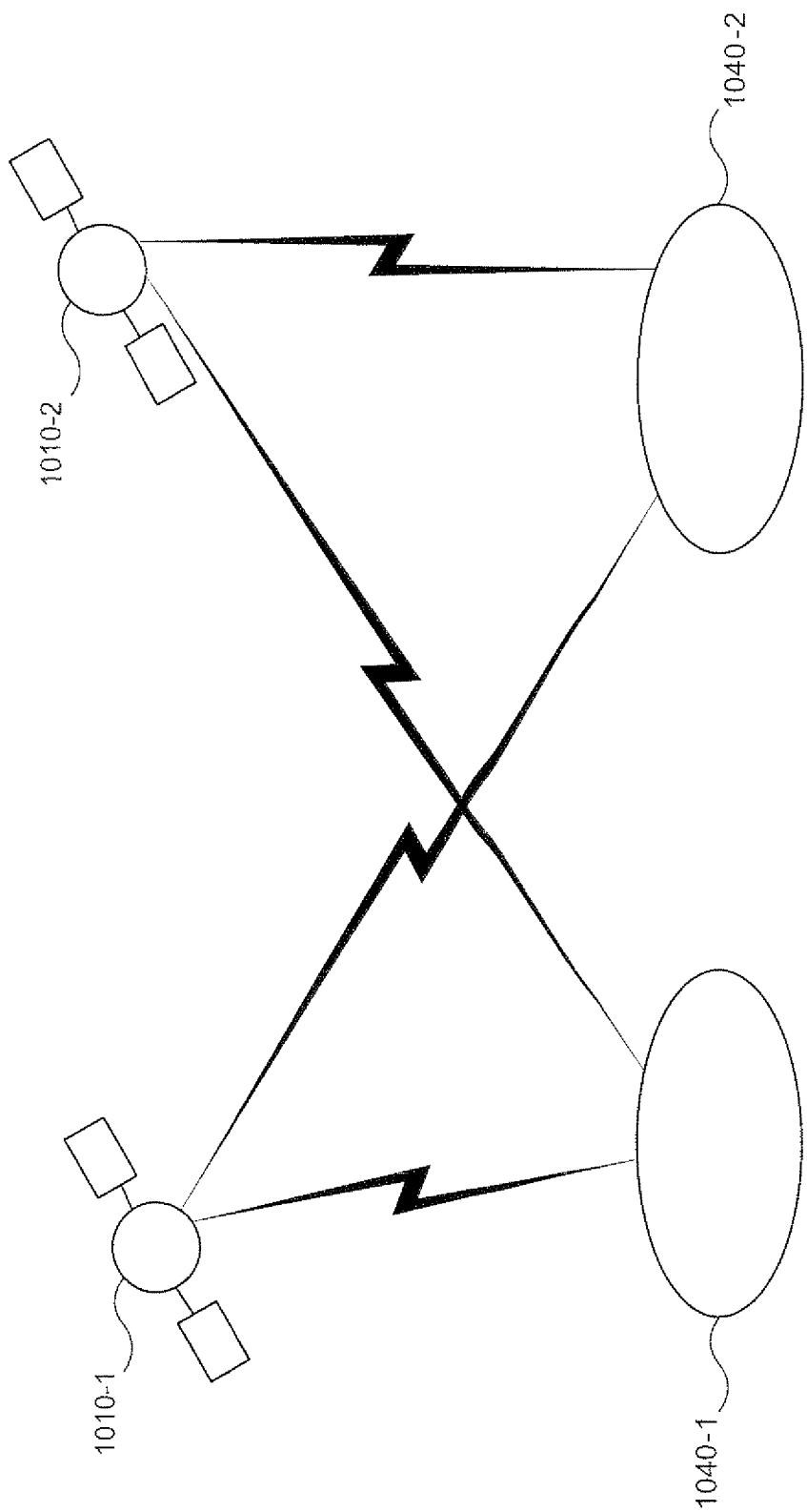
FIG. 10B illustrates a non-limiting example of a digital wireless broadcast system with multiple satellites serving multiple service areas without ground stations.

It is difficult to synchronize the transmissions of two satellites so that their signals are received with a small relative timing difference over an entire continent. To overcome this difficulty, the satellite spectrum can be divided into multiple portions to provide two-satellite diversity. This is illustrated in FIG. 10B which includes two satellites 1010-1 and 1010-2 and two service areas 1040-1 and 1040-2. The frequency spectrum is divided into portions 1 and 2—i.e., into carriers 1 and 2—and both carriers are transmitted by both satellites. The timings of digital symbol transmissions using carrier 1 of the spectrum can be independently controlled relative to the timing using carrier 2 for one or both satellites. It is also possible to divide a transmission period into timeslots instead of dividing a frequency spectrum, and to adjust the relative timing of the modulations from each satellite on a timeslot by timeslot basis, allocating each timeslot to the respective service area.

Yet another non-limiting alternative is to transmit from each satellite in the same frequency spectrum over the entire continent, but using different polarizations, for example Right Hand Circular and Left Hand Circular polarization. Despite a ±6 mS relative timing difference that can arise at extremely different locations over a continent such as Miami versus Seattle or San Diego versus New York, a dual-polarization diversity receiver used with a diversity equalizer can resolve the transmitted information. Any number of satellites and any number of service areas are also contemplated.

Figure 11A:
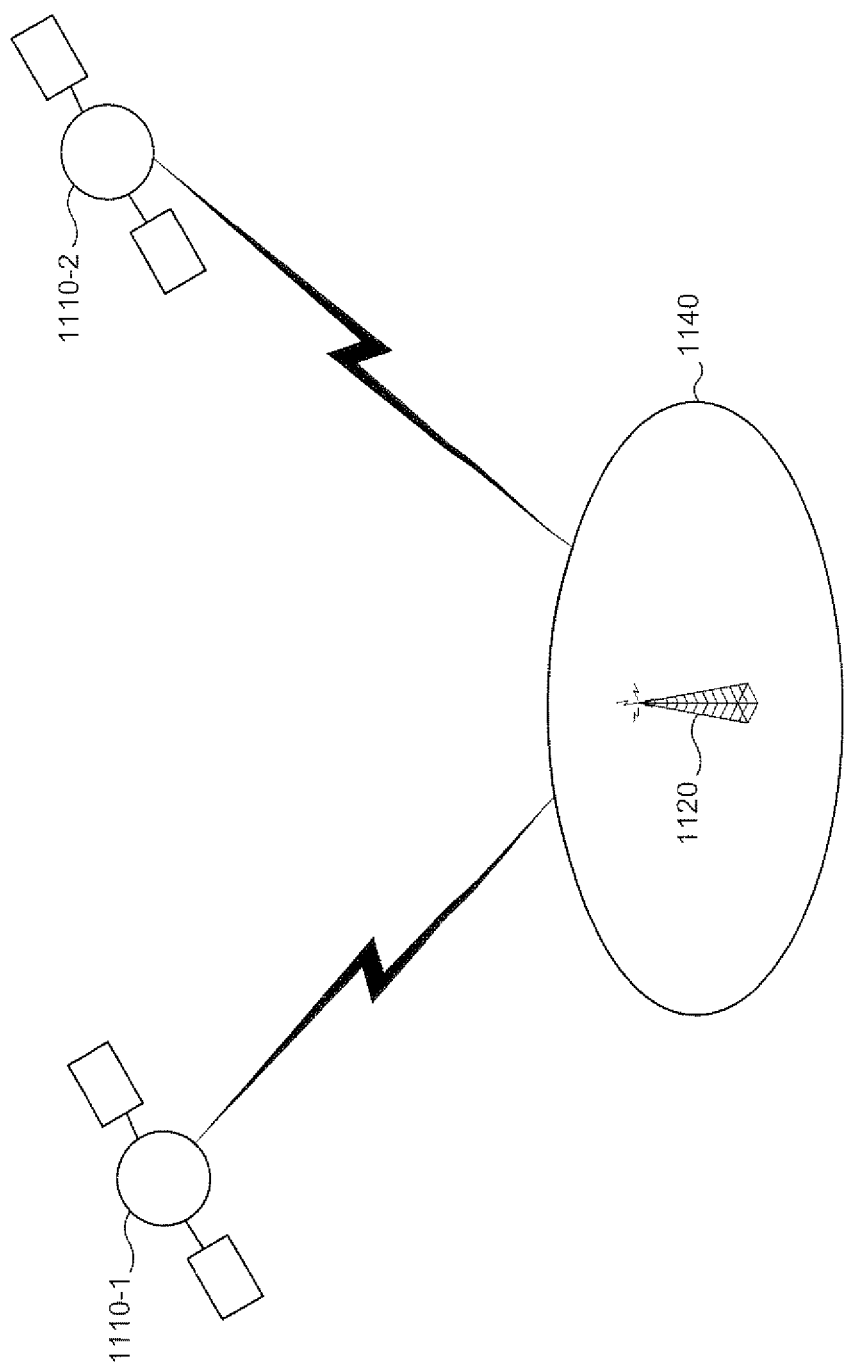
FIG. 11A illustrates a non-limiting example of a digital wireless broadcast system with multiple satellites serving a service area with a ground station.

Multiple frequencies can also be used on the ground stations to provide frequency diversity transmissions as well as terrestrial/satellite spatial diversity for each satellite signal as already described above. This is illustrated in FIG. 11A that illustrates a non-limiting example digital wireless broadcast system with multiple satellites serving a service area with a ground station. The system includes first and second satellites 1110-1 and 1110-2 providing respective satellite signals to the service area 1140. The first satellite 1110-1 provides a digital symbol stream over a first frequency spectrum (spectrum 1) and the second satellite 1110-2 provides the same digital symbol stream over a second frequency spectrum (spectrum 2) where the first and second spectrums are different.

The ground station 1120 can transmit two terrestrial signals as well. The first terrestrial signal is carried over the same frequency spectrum as the first satellite 1111-1 (spectrum 1) and the second terrestrial signal is carried over the same frequency spectrum as the second satellite 1110-2 (spectrum 2). Thus the spectral utilization of the above-disclosed scheme can be improved by a factor 1.5 compared to the existing satellite radio systems.

Figure 11B:
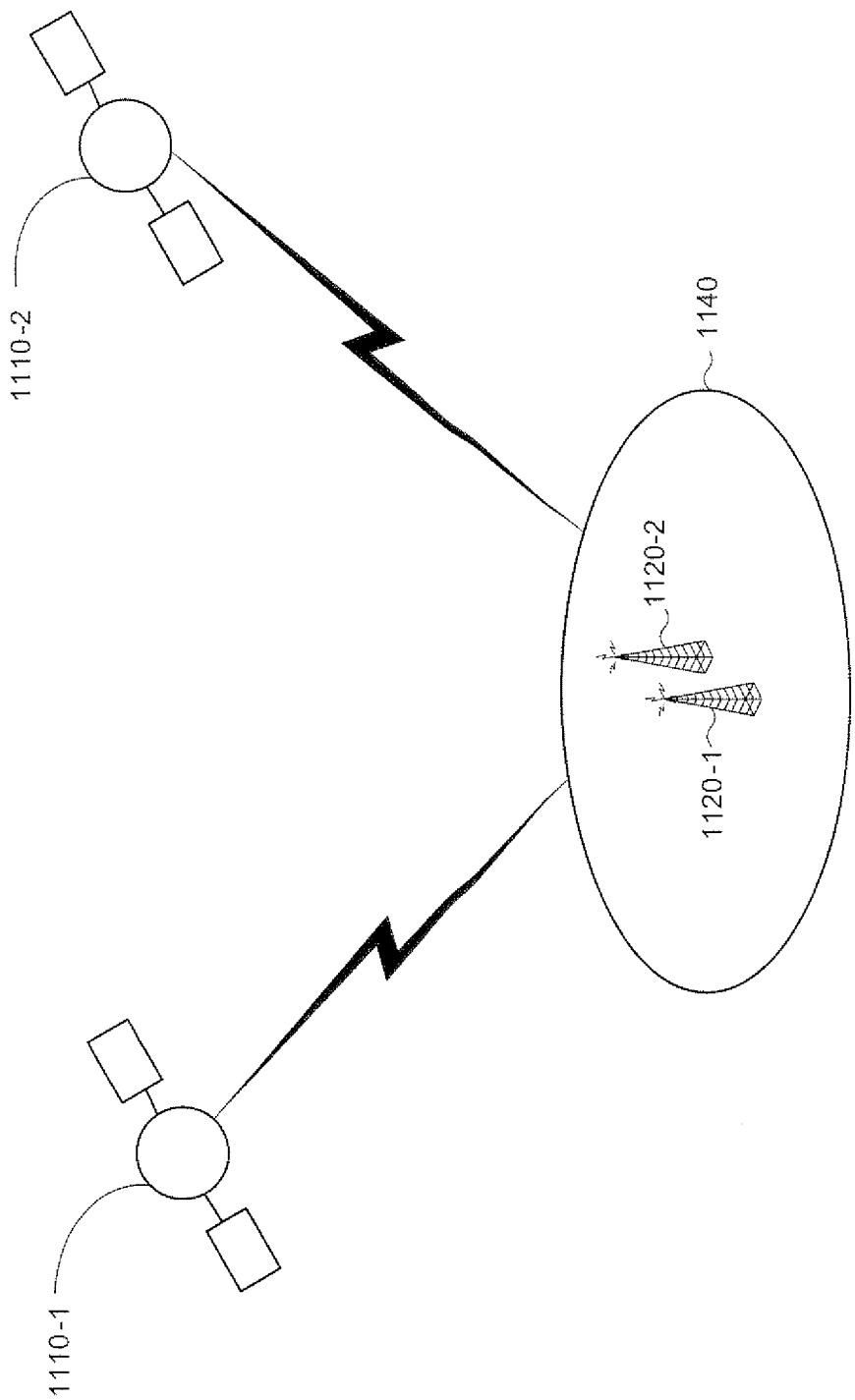
FIG. 11B illustrates a non-limiting example of a digital wireless broadcast system with multiple satellites serving a service area with multiple ground stations.

It is also possible to split ground station 1120 into two stations 1120-1 and 1120-2, which transmit using first and second spectrum respectively as illustrated in FIG. 11B. The terrestrial signal transmitted in the first spectrum has its timing related to the satellite transmission received in the first spectrum in its service area. Similarly, the terrestrial signal transmitted in the second spectrum has a timing related to the satellite transmission received in the second spectrum its respective coverage area.

The differential delay between signals received from a west coast satellite and an east coast satellite can be as much as ±6 mS, which is over 1600 symbols at the GSM symbol rate. A scheme published by Alamouti can be used to provide diversity transmissions with large delay difference between them. When each transmission is also subject to multi-path propagation, an extension of the Alamouti scheme to multi-path channels can be used. This was published by Erik Lindskog and Arogyaswami Paulraj in "A transmit Diversity Scheme for Channels with Intersymbol Interference", 0-7803-6286-1/00, 2000 IEEE, pp 307-311, which is hereby incorporated by reference herein.

To cope with ±6 mS timing difference, a block of known symbols 6 mS long is used with the Alamouti or Lindskog/ Pauljaj scheme. For the block of known symbols, which may be used for channel estimation, to represent an overhead of less than 10%, the block of data symbols lying between blocks of known sync symbols should be of the order of 60 mS long. It is preferred that the channel remains constant over such block periods.

Figure 12:
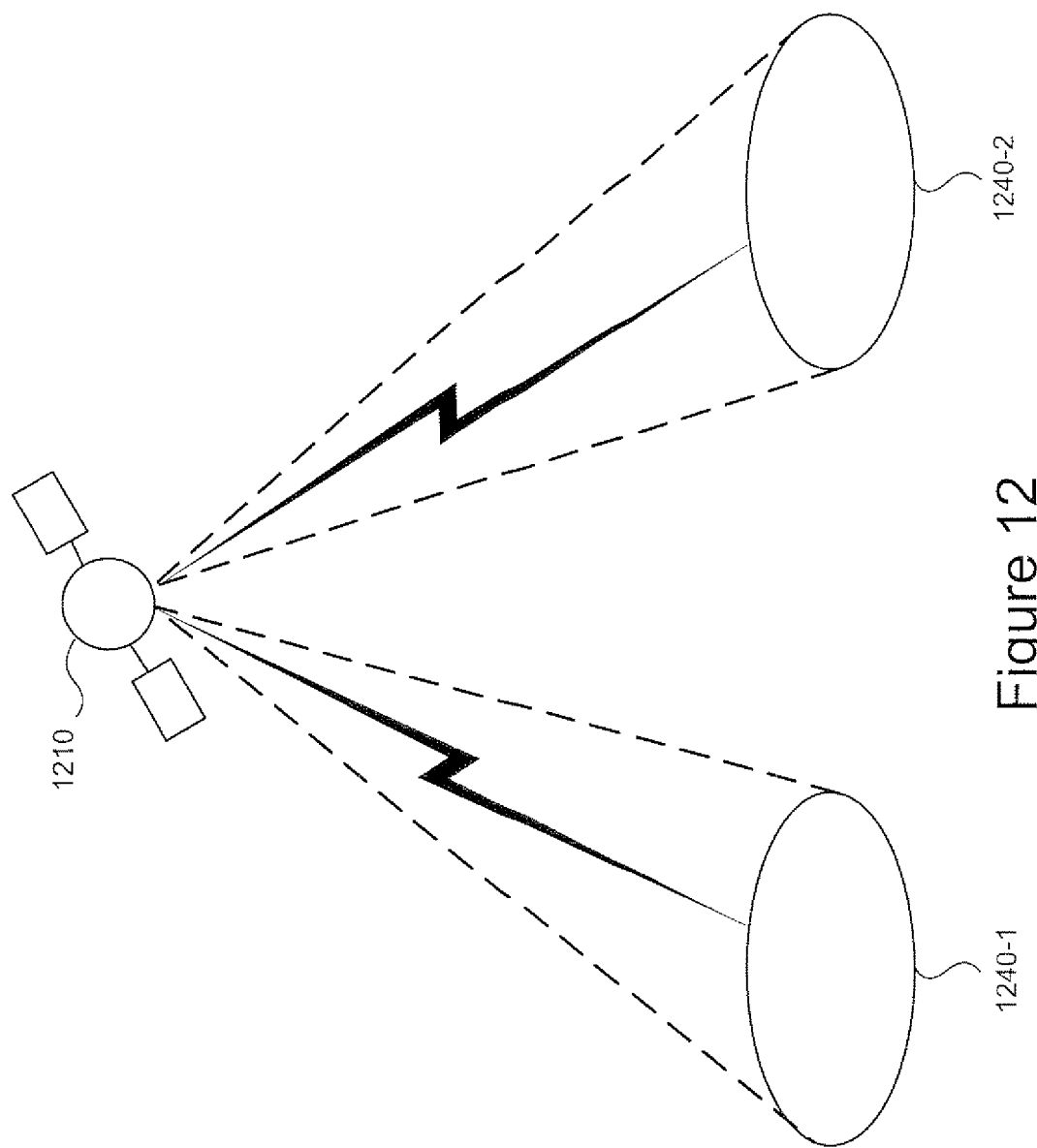
FIG. 12 illustrates a non-limiting example of a digital wireless broadcast system serving multiple service areas.

For mobile receivers, the channel is unlikely to be constant over such long block periods. For frequencies in S-band and vehicle speeds of 60 mph, the block length is preferably less than 0.5 mS. In an example non.-limiting embodiment, the delay difference between two satellites is reduced by dividing the continent into smaller regions, using multiple satellite beams. This is exemplified in FIG. 12 which illustrates a non-limiting example digital wireless broadcast system with a satellite 1210 providing satellite signals to two service areas 1240-1 and 1240-2. A first satellite signal to the first service area 1240-1 is provided via a first beam (beam 1) and a second satellite signal to the second service area 1240-2 is provided via a second beam (beam 2). The first and second satellite beam signals may or may not use the same frequency spectrum. Further, the timings of the first and second beam signals may be independent of each other.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore) no element, component, or method step in the present disclosure is intended to be dedicated to the public.

What is claimed is:

1. A digital wireless broadcast system, comprising:
a plurality of ground stations respectively configured to wirelessly transmit a digital symbol stream over a frequency spectrum to corresponding plurality of service areas; and
a satellite configured to wirelessly transmit the digital symbol stream over the frequency spectrum to the plurality of service areas,
wherein the plurality of ground stations are configured such that the digital symbol stream from each ground station and the digital symbol stream from the satellite arrive within a predetermined time period of each other in each corresponding service area,
wherein the predetermined time period is a relative delay between the digital symbol stream from the satellite and from the ground station that is within a range for which a receiver in the corresponding service area is capable of decoding the digital symbol stream, and
wherein the plurality of ground stations are configured such that a timing of the digital symbol stream transmission from at least one ground station is independently controllable from a timing of the digital symbol stream transmission from at least one other ground station.

2. The system of claim 1, wherein at least one ground station is configured to transmit the digital symbol stream omnidirectionally in azimuth.

3. The system of claim 1, wherein a shape of at least one service area is asymmetrical such that the at least one service area is elongated in a direction away from the satellite.

4. The system of claim 3, wherein at least one ground station corresponding to the at least one service area is configured to transmit the digital symbol stream in a shaped pattern.

5. The system of claim 3, wherein the at least one service area is divided into a plurality of sectors.

6. The system of claim 5, wherein at least one ground station corresponding to the at least one service area is configured such that a timing of the digital symbol stream transmitted to at least one sector of the at least one service area is independently controllable relative to a timing of the digital symbol stream transmitted to at least one other sector of the at least one service area.

7. The system of claim 5, wherein at least one sector of the at least one service area lying in a direction towards the satellite is of a different size or shape or both as compared to at least one sector of the at least one service area lying in a direction away from the satellite.

8. The system of claim 1, wherein at least one ground station is configured such that the digital symbol stream from the at least one ground station is timed nominally to arrive in advance of the digital symbol stream from the satellite in corresponding at least one service area.

9. The system of claim 1,
wherein the plurality of ground stations includes first and second ground stations configured to transmit the digital symbol stream to corresponding first and second service areas, respectively,
wherein the first and second areas are neighboring service areas, and
wherein at a border point between the first and second service areas, the digital symbol streams from the first and second ground stations are timed nominally to arrive with a timing offset less than or substantially equal to a predetermined number of modulation periods.

10. The system of claim 1,
wherein at least one ground station is configured to receive a programming information corresponding to the digital stream from a source other than the satellite for retransmission, or
wherein the at least one ground station is configured to receive the programming information from the satellite transmitted on a different frequency spectrum prior to the satellite transmitting the digital stream over the frequency spectrum, or
both.

11. The system of claim 1, wherein the satellite is a first satellite, the frequency spectrum is a first frequency spectrum, the system further comprising:
a second satellite configured to transmit the digital symbol stream over a second frequency spectrum,
wherein at least one ground station is configured to transmit the digital symbol over the second frequency spectrum such that the digital symbol stream over the second frequency spectrum from the ground station and from the second satellite arrive within the predetermined time period of each other in corresponding at least one service area.

12. The system of claim 1, wherein the satellite is a first satellite, the frequency spectrum is a first frequency spectrum, the system further comprising:
a second satellite configured to transmit the digital symbol stream over a second frequency spectrum; and
at least one second frequency ground station different from the plurality of ground stations, the at least one second frequency ground station being configured to transmit the digital symbol over the second frequency spectrum such that the digital symbol stream from the at least one second frequency ground station and from the second satellite arrive within the predetermined time period of each other in corresponding at least one second service area.

13. A digital wireless broadcast system, comprising:
a first satellite configured to transmit a digital symbol stream over first a frequency spectrum to a first service area; and
a second satellite configured to transmit the digital symbol stream over the first frequency spectrum to the first service area,
wherein the first and second satellites are configured such that the digital symbol stream from the first and second satellites arrive in the first service area within a predetermined time period of each other,
wherein the predetermined time period is a relative delay between the digital symbol stream from the first and second satellites that is within a range for which a receiver in the first service area is capable of decoding the digital symbol stream, and
wherein the first and second satellites are both configured to transmit the digital symbol stream over a second frequency spectrum to a second service area such that the digital symbol stream from the first and second satellites arrive in the second service area within the predetermined time period of each other.

14. A digital wireless broadcast system, comprising:
a first satellite configured to transmit a digital symbol stream over a frequency spectrum to a first service area; and
a second satellite configured to transmit the digital symbol stream over the frequency spectrum to the first service area,
wherein the first and second satellites are configured such that the digital symbol stream from the first and second satellites arrive in the first service area within a predetermined time period of each other,
wherein the predetermined time period is a relative delay between the digital symbol stream from the first and second satellites that is within a range for which a receiver in the first service area is capable of decoding the digital symbol stream,
wherein the first and second satellites are each configured to transmit the digital symbol stream over the frequency spectrum to a second service area such that the digital symbol stream from the first and second satellites arrive in the second service area within the predetermined time period of each other, and
wherein at least one of the following applies:
the first and second satellites each transmit the digital symbol stream using first and second directed beams to the corresponding the first and second areas, and
the first and second satellites each transmit the digital symbol stream using first and second polarizations to the corresponding the first and second areas.

15. A digital wireless broadcast method, comprising:
wirelessly transmitting, from a plurality of ground stations, a digital symbol stream over a frequency spectrum to corresponding plurality of service areas; and
wirelessly transmitting, from a satellite, the digital symbol stream over the frequency spectrum to the plurality of service areas,
wherein the digital symbol stream from each ground station and the digital symbol stream from the satellite arrive within a predetermined time period of each other in each corresponding service area,
wherein the predetermined time period is a relative delay between the digital symbol stream from the satellite and from the ground station that is within a range for which a receiver in the corresponding service area is capable of decoding the digital symbol stream, and
wherein a timing of the digital symbol stream transmission from at least one ground station is independently controlled from a timing of the digital symbol stream transmission from at least one other ground station.

16. The method of claim 15, wherein the act of transmitting the digital symbol stream from the plurality of ground stations comprises transmitting the digital symbol stream omnidirectionally in azimuth from at least one ground station.

17. The method of claim 15, wherein a shape of at least one service area is asymmetrical such that the at least one service area is elongated in a direction away from the satellite.

18. The method of claim 17, wherein the act of transmitting the digital symbol stream from the plurality of ground stations comprises transmitting the digital symbol stream from at least one ground station corresponding to the at least one service area in a shaped pattern.

19. The method of claim 17, wherein the at least one service area is divided into a plurality of sectors.

20. The method of claim 19, wherein the act of transmitting the digital symbol stream from the at least one ground station comprises independently controlling a timing of the digital symbol stream transmitted to at least one sector of the at least one service area relative to a timing of the digital symbol stream transmitted to at least one other sector of the at least one service area.

21. The method of claim 15, wherein the act of transmitting the digital symbol stream from the plurality of ground stations comprises transmitting such that the digital symbol stream from at least one ground station arrives in advance of the digital symbol stream from the satellite in corresponding at least one service area.

22. The method of claim 15,
wherein the plurality of ground stations includes first and second ground stations with corresponding first and second service areas, respectively,
wherein the first and second areas are neighboring service areas, and
wherein the act of transmitting the digital symbol stream from the plurality of ground stations comprises transmitting such that at a border point between the first and second service areas, the digital symbol streams from the first and second ground stations are timed nominally to arrive with a timing offset less than or substantially equal to a predetermined number of modulation periods.

23. The method of claim 15, wherein the satellite is a first satellite, the frequency spectrum is a first frequency spectrum, the method further comprising:
transmitting, from a second satellite, the digital symbol stream over a second frequency spectrum; and
transmitting, from at least one ground station, the digital symbol stream over the second frequency spectrum such that the digital symbol stream over the second frequency spectrum from the at least one ground station and from the second satellite arrive within the predetermined time period of each other in corresponding at least one service area.

24. A digital wireless broadcast method, comprising:
transmitting, from a first satellite, a digital symbol stream over a first frequency spectrum to a first service area and over a second frequency spectrum to a second service area;
transmitting, from a second satellite, the digital symbol stream over the first frequency spectrum to the first service area and over the second frequency spectrum to the second service area,
wherein the digital symbol streams from the first and second satellites arrive to a receiver in the first service area within a predetermined time period of each other,
wherein the digital symbol streams from the first and second satellites arrive to a receiver in the second service area within the predetermined time period of each other, and
wherein the predetermined time period is a relative delay between the digital symbol stream from the first and second satellites that is within a range for which the receiver is capable of decoding the digital symbol stream.

25. The system of claim 2, wherein at least one ground station is configured such that the digital symbol stream transmitted from the at least one ground station is advanced by an amount substantially equal to $$\frac{r}{c}$$

relative to the digital symbol stream arriving from the satellite that would be received at the at least one ground station, r being a radius of the corresponding at least one service area corresponding to the at least one ground station and c being a speed of light.

26. The system of claim 3, wherein at least one ground station is configured such that the digital symbol stream transmitted from the at least one ground station is advanced relative to the digital symbol stream arriving from the satellite that would be received at the at least one ground station, and the digital symbol stream transmitted from the at least one ground station in a direction toward the satellite is more advanced than the digital symbol stream transmitted in the direction away from the satellite.

27. The method of claim 16, wherein the act of transmitting the digital symbol stream from the plurality of ground stations further comprises advancing the digital symbol transmitted from the at least one ground station by an amount equal to $$\frac{r}{c}$$

relative to the digital symbol stream arriving from the satellite that would be received at the at least one ground station, r being a radius of the corresponding at least one service area corresponding to the at least one ground station and c being a speed of light.

28. The method of claim 17, wherein the act of transmitting the digital symbol stream from the plurality of ground stations comprises advancing the digital symbol transmitted from the at least one ground station relative to the digital symbol stream arriving from the satellite that would be received at the at least one ground station, and wherein the digital symbol stream transmitted from the at least one ground station in a direction toward the satellite is more advanced than the digital symbol stream transmitted in the direction away from the satellite.

29. A digital wireless broadcast method, comprising:

transmitting, from a first satellite, a digital symbol stream over a frequency spectrum to a first service area and over the frequency spectrum to a second service area;

transmitting, from a second satellite, the digital symbol stream over the frequency spectrum to the terrestrial first service area and over the frequency spectrum to the second service area, wherein the digital symbol streams from the first and second satellites arrive to a receiver in the first service area within a predetermined time period of each other, wherein the digital symbol streams from the first and second satellites arrive to a receiver in the second service area within the predetermined time period of each other, wherein the predetermined time period is a relative delay between the digital symbol stream from the first and second satellites that is within a range for which the receiver is capable of decoding the digital symbol stream, wherein at least one of the following applies:

the first and second satellites each transmit the digital symbol stream using first and second directed beams to the corresponding the first and second areas, and the first and second satellites each transmit the digital symbol stream using first and second polarizations to the corresponding the first and second areas.

* * * * *